US011829147B2

(12) United States Patent
Sampaio Martins Pereira

(10) Patent No.: US 11,829,147 B2
(45) Date of Patent: Nov. 28, 2023

(54) PATH PLANNING

(71) Applicant: Dyson Technology Limited, Wiltshire (GB)

(72) Inventor: Nino Sancho Sampaio Martins Pereira, Swindon (GB)

(73) Assignee: Dyson Technology Limited, Malmesbury (GB)

(*) Notice: Subject to any disclaimer, the term of this patent is extended or adjusted under 35 U.S.C. 154(b) by 458 days.

(21) Appl. No.: 17/284,221

(22) PCT Filed: Oct. 2, 2019

(86) PCT No.: PCT/GB2019/052781
§ 371 (c)(1),
(2) Date: Apr. 9, 2021

(87) PCT Pub. No.: WO2020/074860
PCT Pub. Date: Apr. 16, 2020

(65) Prior Publication Data
US 2021/0341928 A1 Nov. 4, 2021

(30) Foreign Application Priority Data
Oct. 10, 2018 (GB) ...................... 1816528

(51) Int. Cl.
*G05D 1/02* (2020.01)
*A47L 9/00* (2006.01)
*A47L 9/28* (2006.01)
(52) U.S. Cl.
CPC ............ *G05D 1/0214* (2013.01); *A47L 9/009* (2013.01); *A47L 9/2826* (2013.01); *A47L 9/2852* (2013.01);
(Continued)

(58) Field of Classification Search
CPC .......... G05D 1/0214; G05D 2201/0215; A47L 9/009; A47L 9/2826; A47L 9/2852; A47L 2201/04
See application file for complete search history.

(56) References Cited

U.S. PATENT DOCUMENTS 5,646,855 A    7/1997  Jones et al.
5,999,881 A   12/1999  Law et al.
(Continued)

FOREIGN PATENT DOCUMENTS

CN    105469445 A    4/2016
CN    105737830 A    7/2016
(Continued)

OTHER PUBLICATIONS

Office Action received for Japanese Patent Application No. 2021-519720, dated Jul. 5, 2022, 4 pages (2 pages of English Translation and 2 pages of Original Document).
(Continued)

*Primary Examiner* — Mathew Franklin Gordon
(74) *Attorney, Agent, or Firm* — Faegre Drinker Biddle & Reath LLP

(57) ABSTRACT

A method of determining an obstacle-free path between a start point and a target point. The method includes the steps of providing a plurality of waypoints wherein the waypoints are linearly distributed between the start point and the target point; determining a sequence for the waypoints where the first waypoint is positioned at the start point and the last waypoint is positioned at the target point; and processing each of the plurality of waypoints in the sequence iteratively from the second waypoint to the last waypoint. The step of processing for each of the plurality of waypoints comprises identifying an obstacle closest to a waypoint of interest and calculating a first distance between the waypoint of interest and the identified closest obstacle, and subsequently chang- (Continued)

ing the location of the waypoint of interest if the first distance is less than a clearance threshold.

26 Claims, 17 Drawing Sheets

(52) U.S. Cl.
CPC .. *A47L 2201/04* (2013.01); *G05D 2201/0215* (2013.01)

(56) References Cited

U.S. PATENT DOCUMENTS

| | | |
|---|---|---|
| 6,963,800 B1 | 11/2005 | Milbert |
| 8,234,032 B2 | 7/2012 | Lee et al. |
| 2005/0192749 A1 | 9/2005 | Flann et al. |
| 2011/0035087 A1 | 2/2011 | Kim et al. |
| 2013/0166134 A1 | 6/2013 | Shitamoto et al. |
| 2014/0121833 A1 | 5/2014 | Lee et al. |
| 2017/0169288 A1 | 6/2017 | Lee |
| 2017/0219353 A1 | 8/2017 | Alesiani |
| 2017/0241790 A1 | 8/2017 | Yoshikawa |
| 2017/0341235 A1 | 11/2017 | Baloch et al. |
| 2018/0100743 A1 | 4/2018 | Diaz et al. |

FOREIGN PATENT DOCUMENTS

| | | |
|---|---|---|
| CN | 107065880 A | 8/2017 |
| EP | 1265078 A2 | 12/2002 |
| JP | 07-064634 A | 3/1995 |
| JP | 2013-235409 A | 11/2013 |
| JP | 2014-232509 A | 12/2014 |
| KR | 10-2008-0077488 A | 8/2008 |
| KR | 10-2012-0033630 A | 4/2012 |
| KR | 10-1133037 B1 | 4/2012 |
| KR | 10-2013-0106161 A | 9/2013 |
| KR | 10-2016-0088638 A | 7/2016 |

OTHER PUBLICATIONS

International Search Report and Written Opinion dated Dec. 11, 2019, directed to International Application No. PCT/GB2019/052781; 11 pages.

Search Report dated Mar. 28, 2019, directed to GB Application No. 1816528.2; 1 page.

Vilca et al. (2016), "Optimal Multi-Criteria Waypoint Selection for Autonomous Vehicle Navigation in Structured Environment," J Intell Robot Syst 82: 301-324.

Office Action received for Korean Patent Application No. 10-2021-7013860, dated May 24, 2023, 10 pages (5 pages of English Translation and 5 pages of Original Document).

PATH PLANNING

REFERENCE TO RELATED APPLICATIONS

This application is a national phase application under 35 USC 371 of International Application No. PCT/GB2019/052781, filed Oct. 2, 2019, which claims the priority of United Kingdom Application No. 1816528.2, filed Oct. 10, 2018, the entire contents of each of which are incorporated herein by reference.

FIELD OF THE DISCLOSURE

The present invention relates to path planning, and in particular to a method and system for determining an obstacle-free path between a start point and a target point, with particular utility for a mobile robotic device.

BACKGROUND OF THE DISCLOSURE

Mobile robotic devices are becoming increasingly commonplace and are used in such diverse fields as space exploration, telepresence, home assistance, lawn mowing and floor cleaning. Recently there has been a rapid advancement in the field of domestic robots, the primary objective of which is to navigate a user's home autonomously and unobtrusively carrying out operations such as vacuuming and cleaning, whilst requiring as little assistance from a human user as possible and preferably none.

In performing such tasks, mobile robotic devices must be able to autonomously navigate and negotiate obstacles within their environment. It is often the case that mobile robotic devices are configured to travel along established paths using pathway patterns. On encountering an obstacle on the path, the mobile robotic device will then re-adjust and re-manoeuvre in order to negotiate its way around the obstacle until it can resume on the path. With the advances in mobile robotic devices, there is an increasing emphasis on advanced path planning which is carried out before the mobile robotic device navigates an environment. Instead of the mobile robot simply following a pattern and then handling obstacles ad-hoc as it encounters them, instead a pathway is planned in advance which takes into account the obstacles already known to be located within the environment. By planning a pathway in advance in this way, the mobile robotic device is able to navigate an environment more quickly and efficiently, extending battery runtime, and maximising coverage.

Path planning is well known in the art, and there are a number of schemes available. However path planning schemes typically require considerable processing time and power. Accordingly, either powerful processors are required to carry out path planning which can be both costly and power hungry, or the process can take considerable time to complete. This can make path planning systems expensive, and also difficult to implement on-board a mobile robotic device, particularly if the mobile robotic device is a consumer robotic device such as a robotic vacuum cleaner.

One example of path planning is described in WO2016/050274A1. This describes a path planning scheme which calculates all possible paths between a start point and an end point that pass through a range of possible nodes between the two. Any of those paths that are obstructed by an obstacle are then excluded, and a cost function associated with each of the remaining paths is calculated. The path through the range of possible nodes that has the lowest cost function from the remaining un-excluded paths is then selected.

Whilst this scheme is effective in finding an efficient path that avoids all obstacles, the processing requirements associated with calculating all possible routes, and also calculating cost functions is considerable.

Therefore, improved path planning schemes are required which are still effective in determining obstacle-free paths but which require far less processing power.

SUMMARY OF THE DISCLOSURE

A first aspect of the invention provides a method of determining an obstacle-free path between a start point and a target point. The method comprises the steps:
providing a plurality of waypoints wherein said waypoints are linearly distributed between the start point and the target point;
determining a sequence for the waypoints where the first waypoint is positioned at the start point and the last waypoint is positioned at the target point; and
processing each of the plurality of waypoints in the sequence iteratively from the second waypoint to the last waypoint.

The step of processing for each of the plurality of waypoints comprises identifying an obstacle closest to a waypoint of interest and calculating a first distance between the waypoint of interest and the identified closest obstacle, and subsequently changing the location of the waypoint of interest if the first distance is less than a clearance threshold.

As a result, a method of determining an obstacle-free path is achieved that divides a path-planning task into a number of smaller processes that can be quick and easy to process. As a result, the method can be carried out using lower-powered processors to other path planning algorithms. This in turn increases the likelihood that such a method can be carried out on board a mobile robot without requiring the mobile robot to be equipped with a high-power or high performance processor which could increase the cost of the mobile robot significantly. What is more, when carried out by a battery-powered device, the battery life of the device can be extended due to the low performance requirements of the processor required to carry out the method.

The step of changing the location of the waypoint of interest if the first distance is less than a clearance threshold may comprise the steps of:
computing a set of points that are positioned at both a first predetermined distance from a waypoint previous to the waypoint of interest and also at a second predetermined distance from the identified closest obstacle;
selecting a preferred point from the set of points; and
changing the location of the waypoint of interest to the preferred point.

As a result, a fast method of identifying a new location for the waypoint of interest can be achieved which is based on simple geometrical analysis and demands little by way of processing power.

The step of computing the set of points may comprise computing intersection points between a first shape and a second shape, wherein the first shape is centred at a waypoint previous to the waypoint of interest and with a radius equal to the first predetermined distance, and the second shape is centred at the identified closest obstacle and with a radius equal to the second predetermined distance, and wherein the intersection points are taken to be the set of points. The first and second shapes may be a circle or a sphere. This provides a simple geometrical shape that can easily be used to identify the position of intersection points. What is more the radius of the circles or spheres can be set as required to match the clearance distances of a mobile vehicle that requires to navigate along the path without contacting obstacles.

The first predetermined distance may be equal to a step length between waypoints. The new location of the waypoint will therefore always remain a step length away from the previous waypoint, reducing the risk that a vehicle travelling on the path will be required to travel large distances between waypoints which won't have been analysed for being clear of obstacles.

The second predetermined distance may be equal to the clearance threshold. As a result, the new location of the waypoint will definitely be at least the clearance threshold away from the obstacle, and the new location of the waypoint will ensure that the path avoids the obstacle.

The step of selecting a preferred point may comprise calculating distances between each computed point in the set of points and a horizon point, and selecting the point closest to the horizon point. The horizon point may lie on a line connecting two consecutive waypoints in the sequence of waypoints between the waypoint of interest and the target point. As a result, the most appropriate point is selected to ensure the path follows as closely as possible to the original, unprocessed linear path of waypoints between the start point and the target point.

The step of processing each of the plurality of waypoints in the sequence iteratively may further comprise calculating a third distance between the waypoint of interest and a previous waypoint in the sequence; and comparing said third distance between the waypoint of interest and the previous waypoint with a predetermined step length threshold. If the third distance between the waypoint of interest and the previous waypoint is greater than the predetermined step length threshold, then the location of the waypoint of interest may be changed to a point lying on a line segment connecting said previous waypoint and a next waypoint in the sequence, said point being located on the line segment at a distance equal to the predetermined step length from the previous waypoint. As a result, the waypoint will therefore remain a step length away from the previous waypoint, reducing the risk that a vehicle travelling on the path will be required to travel large distances between waypoints which won't have been analysed for being clear of obstacles.

The previous waypoint may be any of the waypoints in the sequence from the start point up to the waypoint of interest, and the next waypoint is any of the waypoints in the sequence from the waypoint of interest up to the target point.

The method may further comprise, after changing the location of the waypoint to the preferred point, identifying an obstacle closest to the new location of the waypoint of interest and calculating a fourth distance between the waypoint of interest and the identified closest obstacle, and subsequently removing the waypoint of interest from the sequence if the fourth distance is less than the clearance threshold. As a result, if the new location of the waypoint brings the waypoint too close to another obstacle, then the new location won't be used within the planned pathway as the waypoint is discarded. This ensures that the path determined by the method remains obstacle-free.

The method may further comprise, after changing the location of the waypoint of interest to the preferred point, the additional steps of calculating a fifth distance between the waypoint of interest and a previous waypoint in the sequence; calculating a sixth distance between the waypoint of interest and a waypoint before the previous waypoint in the sequence; and comparing the fifth distance with the sixth distance. If the sixth distance is smaller than the fifth distance, then the waypoint of interest can be removed from the sequence. As a result, if the new location of the waypoint of interest takes the path back towards an earlier waypoint in the sequence, and therefore directs the path back towards itself instead of towards the target point, then it can be removed from the sequence.

A second aspect of the invention provides a system comprising:
  memory storing data relating to an environment including locations of any obstacles located in the environment;
  memory storing data relating to path planning comprising locations of a start point and a target point, a plurality of waypoints, a sequence of said plurality of waypoints, and a clearance threshold; and
  a path planning engine comprising at least one processor, and configured to iteratively process each of the plurality of waypoints to determine an obstacle-free path between a start point and a target point.

To process each of the plurality of waypoints the path planning engine is configured to identify an obstacle closest to a waypoint of interest, calculate a first distance between the waypoint of interest and the identified closest obstacle, and subsequently update the data corresponding to the location of the waypoint of interest to change its location if the first distance is less than the clearance threshold.

As a result, the system as able to determine an obstacle-free path between the start point and the target point by splitting up the pathway between the start point and the target point into a number of discrete waypoints that can be processed individually. This reduces the demand on the processor, and a lower-powered processor can be used. In turn, this increases the likelihood that such a system can be implemented on board a mobile robot without requiring the mobile robot to be equipped with a high-power or high performance processor which would increase the cost of the mobile robot significantly. What is more, when the system is implemented on a battery-powered device, the battery life of the device can be extended due to the low performance requirements of the processor.

To change the location of the waypoint of interest, the path planning engine may be configured to:
  compute a set of points that are positioned at both a first predetermined distance stored in memory from a waypoint previous to the waypoint of interest and also at a second predetermined distance stored in memory from the identified closest obstacle;
  select a preferred point from the set of points; and
  update the data corresponding to the location of the waypoint of interest to change its location to the preferred point.

As a result, the path planning engine is only required to perform simple geometric analysis in order to change the location of the waypoint of interest. The path planning engine does not require a large amount of processor power in order to achieve this, and thus the path planning engine can plan the path quicker, and/or a cheaper, less powerful processor can be used.

In order to compute the set of points, the path planning engine may be configured to compute intersection points between a first shape and a second shape, wherein the first shape is centred at a waypoint previous to the waypoint of interest and with a radius equal to the first predetermined distance and the second shape is centred at the identified closest obstacle and with a radius equal to the second predetermined distance, and wherein the intersection points are taken to be the set of points. The first and second shapes may be one of a circle or a sphere. A circle or a sphere provides a simple geometrical shape that allows for fast geometric analysis to identify the position of intersection points. What is more the radius of the circles or spheres can be set as required to match the clearance distances of a mobile vehicle that requires to navigate along the path without contacting obstacles.

The first predetermined distance may be equal to a step length between waypoints, the step length being stored in memory in the data relating to path planning. In this way, the new location of the waypoint will always be a fixed step length away from the previous waypoint, reducing the risk that a vehicle travelling on the planned path will be required to travel large distances between waypoints which may not have been analysed for being clear of obstacles.

The second predetermined distance may be equal to the clearance threshold. In this way, it is made certain that the new location of the waypoint will be at least the clearance threshold away from the obstacle, and the new location of the waypoint will ensure that the planned path avoids the obstacle.

In order to select a preferred point, the path planning engine may be configured to calculate distances between each computed point in the set of points and a horizon point, and then select the point closest to the horizon point. The horizon point may lie on a line connecting two consecutive waypoints in the sequence of waypoints between the waypoint of interest and the target point. As a result, the path planning engine is configured to select the most appropriate point to ensure the path follows as closely as possible to the original, unprocessed linear path of waypoints between the start point and the target point.

In order to iteratively process each of the plurality of waypoints the path planning engine may be configured to: calculate a third distance between the waypoint of interest and a previous waypoint in the sequence; and compare said third distance between the waypoint of interest and the previous waypoint with a predetermined step length threshold. If the third distance between the waypoint of interest and the previous waypoint is greater than the predetermined step length threshold, the path planning engine may be configured to update the data corresponding to the location of the waypoint of interest to change the location of the waypoint of interest to a point lying on a line segment connecting said previous waypoint and a next waypoint in the sequence, said point being located on the line segment at a distance equal to the predetermined step length from the previous waypoint. As a result, the waypoint will remain a step length away from the previous waypoint, reducing the risk that a vehicle travelling on the path will be required to travel large distances between waypoints which may not have been analysed for being clear of obstacles.

The previous waypoint may be any of the waypoints in the sequence from the start point up to the waypoint of interest, and the next waypoint may be any of the waypoints in the sequence from the waypoint of interest up to the target point.

After updating the data corresponding to the location of the waypoint of interest to change its location to the preferred point, the path planning engine may be further configured to: identify an obstacle closest to the new location of the waypoint of interest and calculating a fourth distance between the waypoint of interest and the identified closest obstacle; and update the data relating to path planning to remove the waypoint of interest from the sequence if the fourth distance is less than the clearance threshold. As a result, if the new location of the waypoint brings the waypoint too close to another obstacle, then the path planning engine won't use a waypoint at the new location within the planned pathway as the waypoint will be discarded. This ensures that the path determined by the path planning engine remains obstacle-free.

After updating the data corresponding to the location of the waypoint of interest to change its location to the preferred point, the path planning engine may be further configured to: calculate a fifth distance between the waypoint of interest and a previous waypoint in the sequence; calculate a sixth distance between the waypoint of interest and a waypoint before the previous waypoint in the sequence; and compare the fifth distance with the sixth distance. If the sixth distance is smaller than the fifth distance, the path planning engine may be configured to update the data relating to path planning to remove the waypoint of interest from the sequence. As a result, if the new location of the waypoint of interest takes the path back towards an earlier waypoint in the sequence, and therefore directs the path back towards itself instead of towards the target point, the path planning engine will remove from the sequence.

A third aspect of the invention provides a robotic device comprising:
   the system of any of the previous statements relating to a system;
   one or more actuators to enable the robotic device to navigate within the surrounding three-dimensional environment; and
   a navigation engine comprising at least one processor to control the one or more actuators, wherein the navigation engine uses the data relating to the environment and the data relating to path planning stored in memory to navigate the robotic device along an obstacle-free path within the surrounding three-dimensional environment.

A fourth aspect of the invention provides a non-transitory computer-readable storage medium comprising computer-executable instructions which, when executed by a processor, cause a computing device to perform the method of any one of the previous statements relating to a method of determining an obstacle-free path.

BRIEF DESCRIPTION OF THE FIGURES

In order that the present invention may be more readily understood, embodiments of the invention will now be described, by way of example, with reference to the following accompanying drawings, in which.

DETAILED DESCRIPTION OF THE DISCLOSURE

Figure 1:
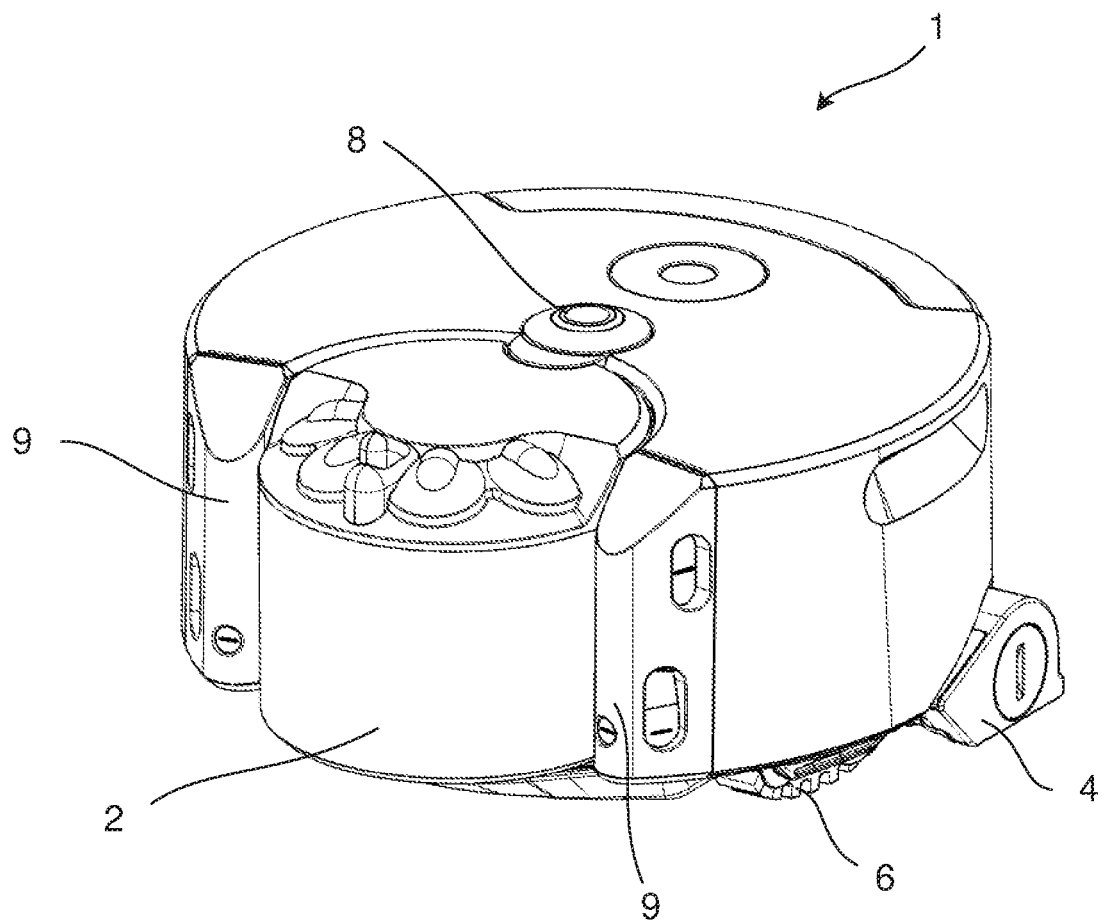
FIG. 1 shows an example of a robotic device.

FIG. 1 shows an example of a robotic device. The robotic device is a robotic vacuum cleaner 1, and has a floor cleaning system comprising a cyclonic separating system 2 and a cleaner head 4. A vacuum motor (not shown) provided inside the main body of the robot vacuum cleaner 1 draws dirty air in from the cleaner head 4, through the cyclonic separator 2 where the dirt particles are removed from the airflow, and then expels the clean air through a vent (not shown) in the back of the robotic vacuum cleaner 1. The robot vacuum cleaner 1 has drive actuators in the form of tank tracks 6 which can be driven to move the robotic vacuum cleaner 1 around an environment in which it is located. The robot vacuum cleaner 1 has a vision sensor 8 which is able to capture images of the environment around the robot vacuum cleaner 1. The robotic device's control system uses Simultaneous Localisation and Mapping (SLAM) techniques on the images captured by the vision sensor 8 in order to build up a map of the environment and to identify the position of the robotic device within that map. The SLAM techniques carried out by the control system also use odometry measurements provided from the drive actuators, and also information provided from other sensors, such as proximity sensors which are located in the sensor housings 9 positioned either side of the cyclonic separator 52.

Figure 2:
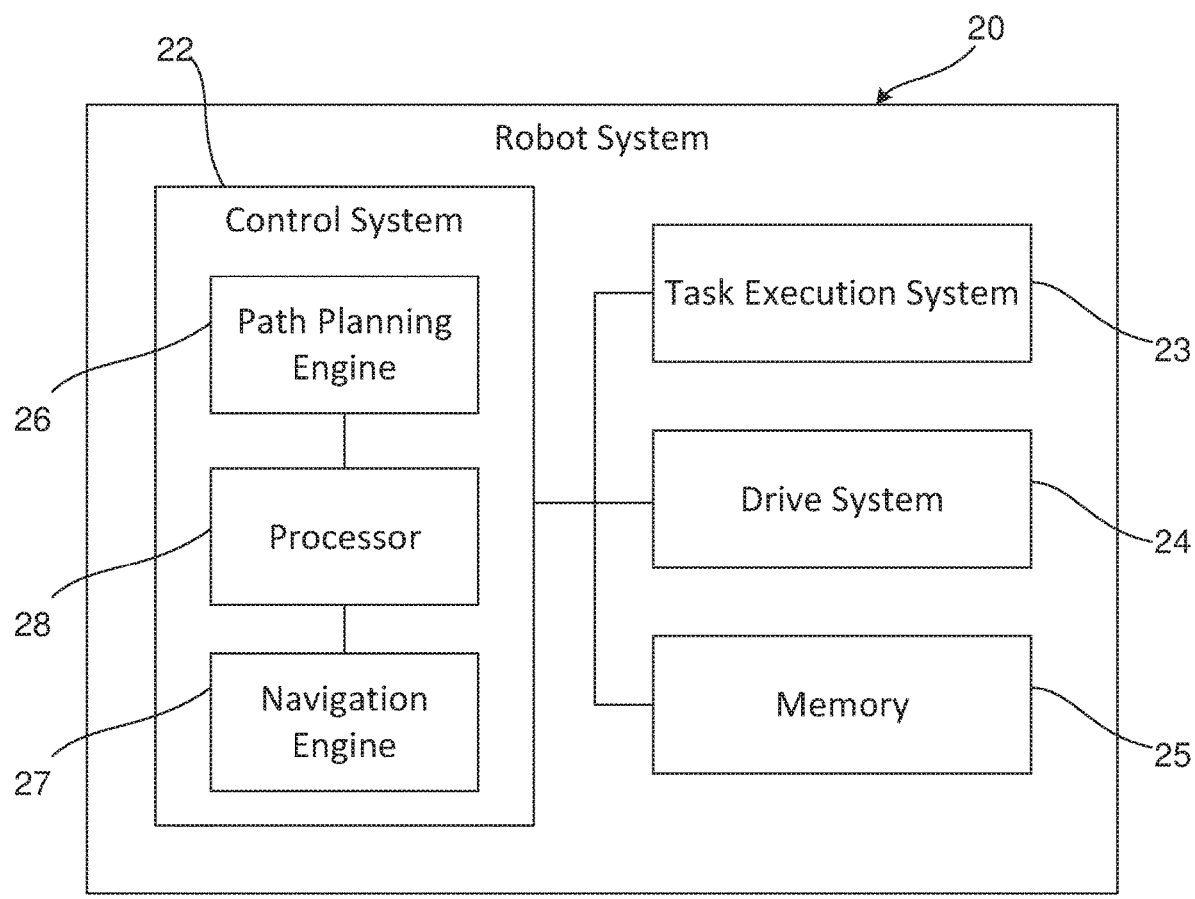
FIG. 2 is a schematic representation of a system on-board the robotic device of FIG. 1.

FIG. 2 is a schematic representation of the system 20 on-board the robotic device 1 of FIG. 1. The system 20 has a control system 22, a task execution system 23, a drive system 24, and memory 25. Although shown as separate, the memory 25 may alternatively be part of the control system 22. The control system 22 comprises a path planning engine 26, a navigation engine 27, and a processor 20.

Figure 3:
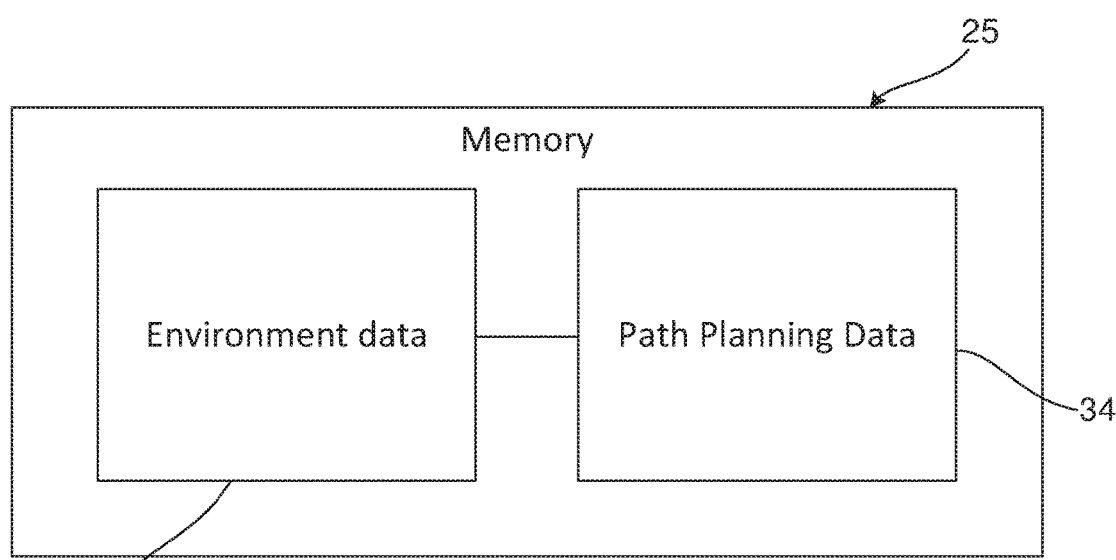
FIG. 3 is a schematic representation of memory in the system of FIG. 2.

The memory 25, as represented schematically in FIG. 3, stores all data required by the robotic device, and includes environment data 32 and path planning data 34. The environment data 32 may include, for example, a map of the environment around the robotic device, and also data relating to the location of any obstacles within the environment. This data may be data that the robotic device has gathered during previous operations of navigating within the environment, or could be pre-programmed into memory using, for example, a 3D representation of an environment that has been previously generated or mapped out by a different device. The path planning data 34 may include information relevant to a desired pathway for the robotic device, locations of a start point and a target point for the desired pathway, intermediate waypoints between the start point and the target point, and a sequence of said plurality of waypoints. Other data relevant to path planning may also be included, such as a clearance threshold which sets out the minimum distance possible between a waypoint and an obstacle, and which may be specific to the robotic device.

Figure 4:
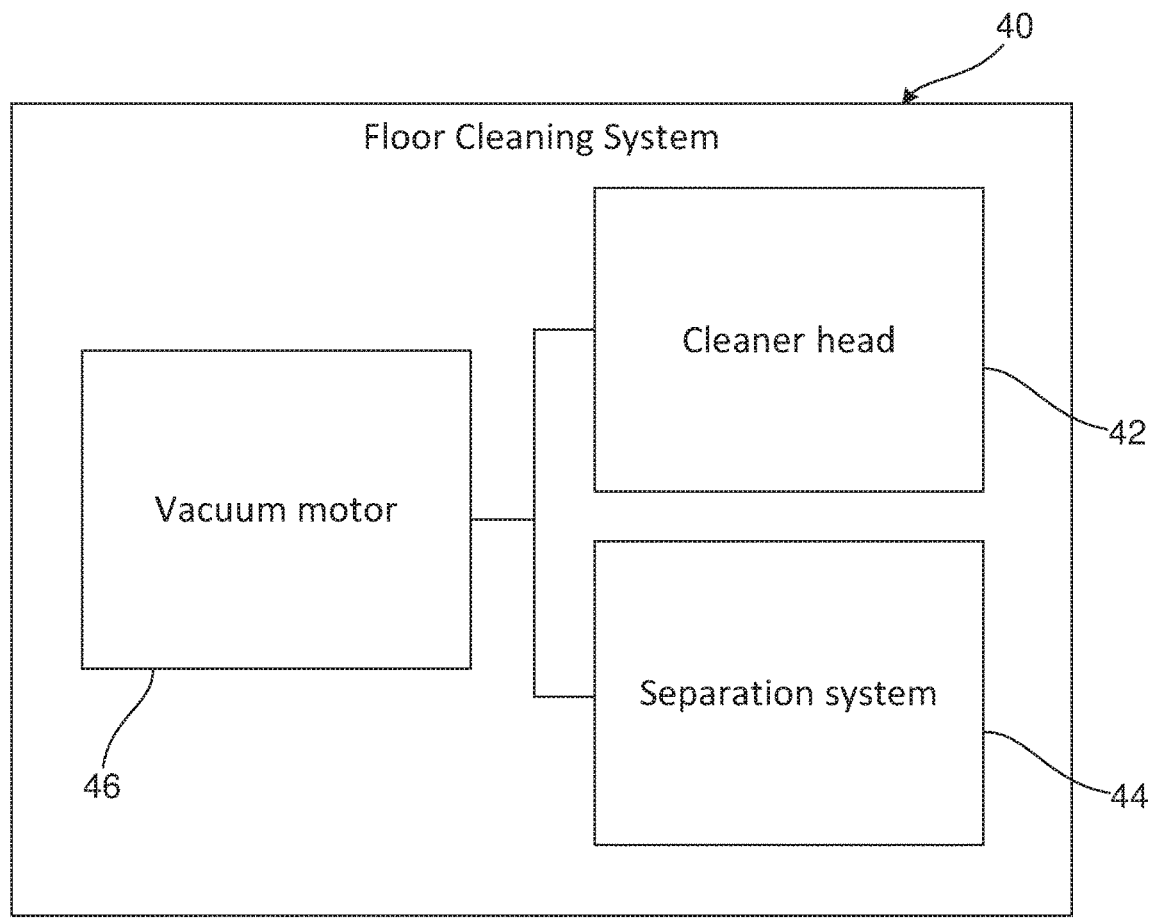
FIG. 4 is a schematic representation of a floor cleaning system of the robotic device of FIG. 1.

The task execution system 23 is the part of the robot system 20 responsible for carrying out tasks or operations assigned to the robotic device. In the robotic device of FIG. 1, the task execution system 23 is a floor cleaning system. A schematic representation of the floor cleaning system 40 is shown in FIG. 4. The floor cleaning system 40 comprises a cleaner head 42, a separation system 44 and a vacuum motor 46. These features of the floor cleaning system are ordinary features of a floor cleaning system, and no further explanation of these systems will be provided here. In alternative embodiments, by way of example, the robotic device may be a robotic lawn mower in which instance the task execution system 23 could be a grass cutting and/or collection system. Other examples of task execution systems will be apparent.

Figure 5:
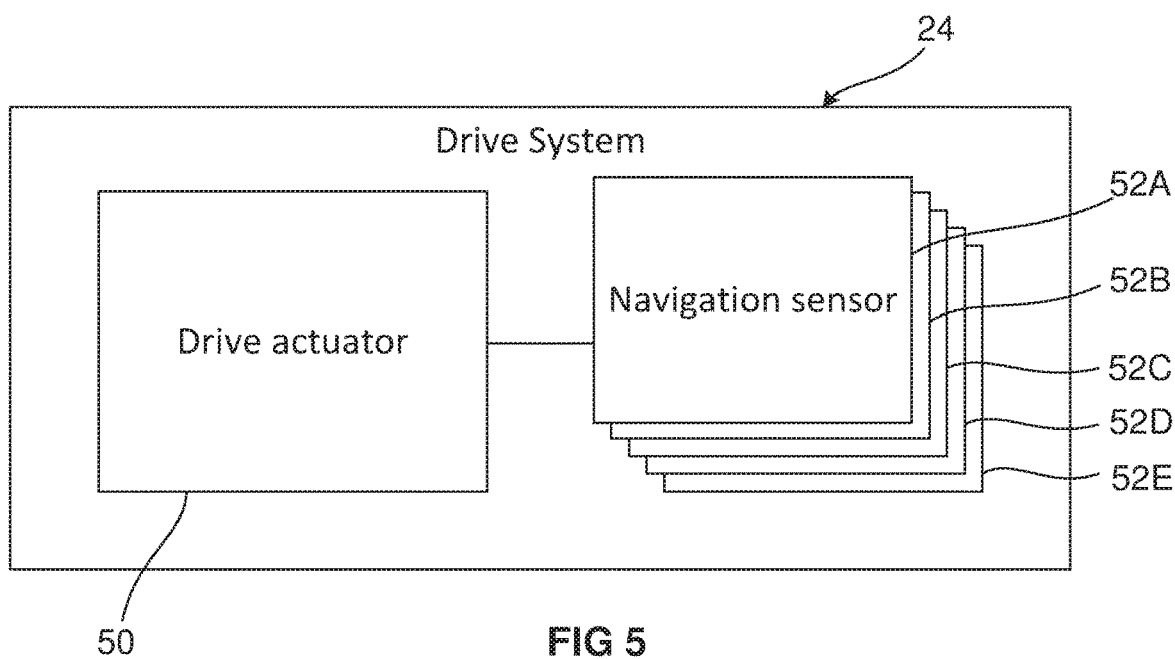
FIG. 5 is a schematic representation of the drive system of the robotic device of FIG. 1.

The navigation engine 27 together with the drive system 24 enable the robotic device to manoeuvre and navigate around an environment. A schematic representation of a drive system 24 is provided in FIG. 5. The drive system 24 is provided with a drive actuator 50 and a number of navigation sensors 52A-E. The drive actuator 50 may be, for example, driven wheels or tank tracks, and is able to provide odometry measurements to the control system 22 of the robot system 20. The odometry measurements can be used by the control system 22, and in particular the navigation engine 27 to estimate the distance and path travelled by the mobile robotic device. Odometry data can also be provided by other sensors, such as optical flow sensors. The navigation sensors 52A-E are sensors that are able to provide additional information to the control system 22 about the environment around the robotic device. For example navigation sensor 52A may be a vision camera, and navigation sensors 52B and 52C may be proximity sensors such as Time of Flight (TOF) sensors, and navigation sensors 52D and 52E may be drop sensors or cliff sensors. Other navigation sensors could be used in addition to or as an alternative to these sensors. For example, the robotic device may comprise a laser range finder. In alternative embodiments, the navigation sensors 52A-E may form part of the navigation engine 27 of the robot system 20. The robot system 20 of the robotic device will typically use a number of different types of navigation sensor in order to be able to autonomously navigate an environment more successfully. The navigation sensors 52A-E provide information to the control system 22 about the environment around the robotic device that enables the control system 22 to build up a map of the environment that can be used by the robotic device to navigate. This environment map can be stored in the memory 25 of the robot system 20. FIG. 3 shows a representation of the memory 25 of the robot system 20. The memory 25 is shown containing environment data 32. The environment data 32 includes the environment map described above, and also includes locations of any obstacles located in the environment. Path planning data 34 is also stored in memory 25. Path planning data 34 includes any data that the robot system 20 requires in order to carry out path planning in advance of navigating the environment. Examples of data that can be included in the path planning data 34 are a start point and a target point, a plurality of intermediate waypoints, a sequence of said plurality of waypoints, and a clearance threshold. How these data are used for path planning will be described in more detail below.

The term "obstacle" as used herein throughout is intended to include any object or hazard that can cause a hindrance to the manoeuvrability of a mobile robotic device within an environment. For example the term "obstacle" includes physical objects and items intended to be placed on a floor surface such as furniture, homeware articles, footwear etc. In addition, "obstacles" also include virtual objects such as user-defined keep out zones or virtual objects, and can also include aspects of the environment itself that can case difficulty to the mobile robotic device such as drops, staircases, zone boundaries etc.

A method of determining an obstacle-free path, or path planning, will now be described. The method is algorithmic, and would be carried out by the path planning engine 26 in the control system 22 of the robot system 20 as previously described. In an alternative embodiment, although not a preferred embodiment, the method could be carried out by a path planning engine on a separate computing device, and then the resulting path data could be transferred to the robot system of the robotic device.

Figure 24:
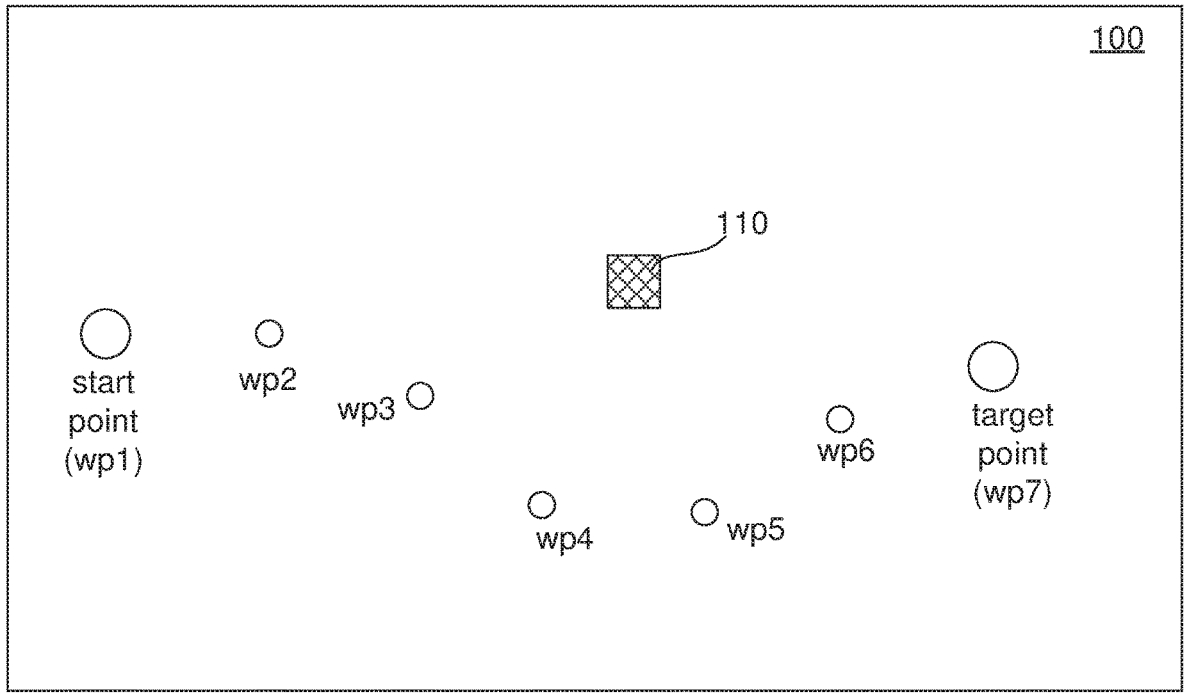
Figure 25:
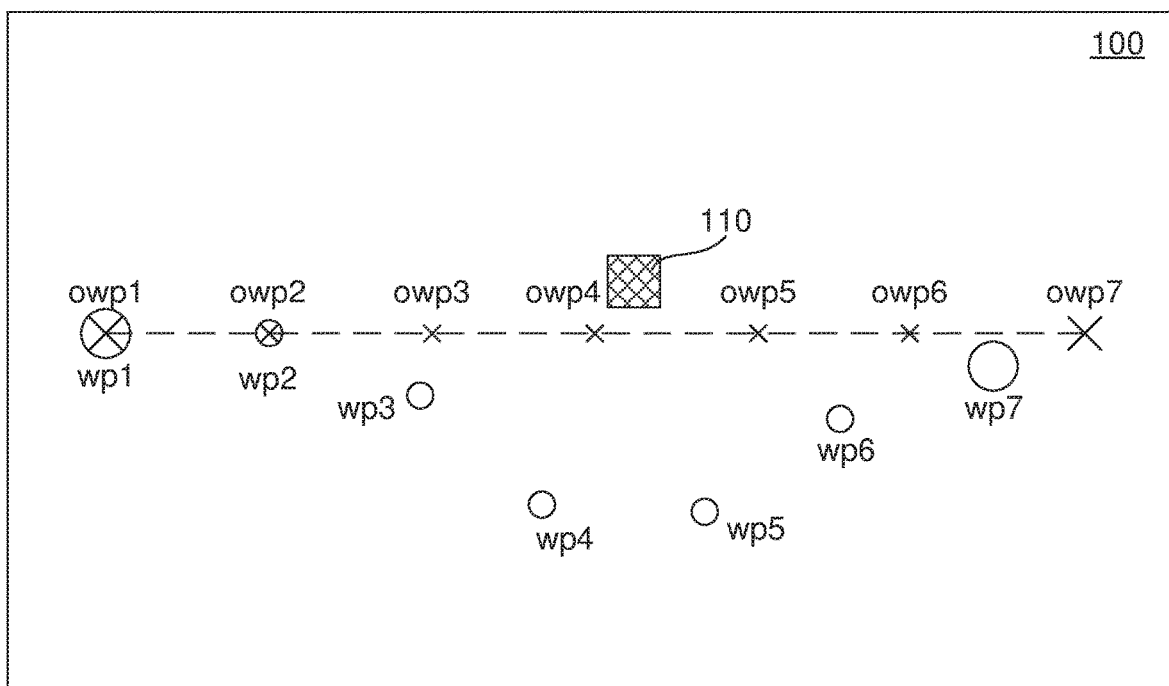
FIG. 25 shows an end result of the path planning operation carried out in FIGS. 7 to 24, with an original path shown alongside an updated processed path.

FIGS. 26 to 29 are flow diagrams which set out the steps of a number of iterative stages carried out during an overall path planning algorithm. The various steps set out in the flow diagrams of FIGS. 26 to 29 are exemplified in the path planning operation being carried out in the environment 100 in FIGS. 6 to 24. The path planning algorithm iteratively processes each of the waypoints wp1 to wp7 in the sequence. Each of the methods of the flow diagrams of FIGS. 26 to 29 are carried out during the processing of each one of the waypoints, however, for clarity some steps are not shown within in FIGS. 6 to 25. FIG. 25 shows the end result of the path planning algorithm with the adjusted path represented by circle-shaped waypoints labelled wp1-7 shown alongside the original waypoints on a linear pathway represented by the cross-shaped waypoints, and labelled owp1-7.

The methods of FIGS. 26 to 29 shall now be described, and then later it will be demonstrated how these methods are being applied in the path planning operation represented in FIGS. 6 to 25.

Figure 26:
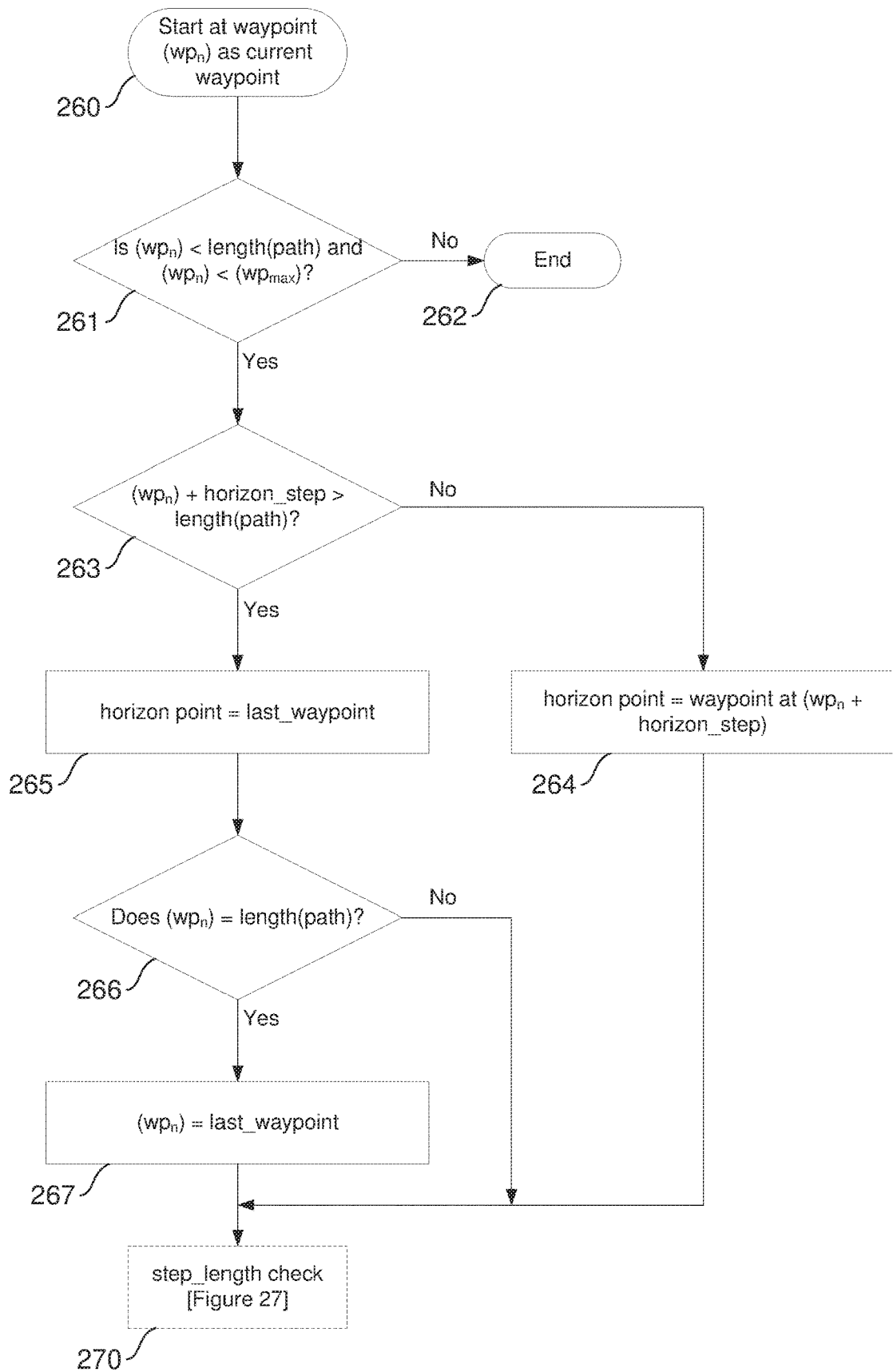
FIGS. 26 to 29 are flow diagrams which detail iterative steps carried out during an algorithmic path planning operation.

FIG. 26 is a flow diagram outlining some initial method steps, which include calculating a horizon point. The horizon point is used in subsequent steps of the method, and it is useful, although not necessary, to calculate the horizon point at the start. The method starts at step 260 which selects the current waypoint ($wp_n$) for processing. The term current waypoint that is used herein should be understood to mean the waypoint of interest for this particular iteration of the method during the iterative processing of each of the waypoints within the sequence. In step 261, a check is carried out to make sure that the current waypoint requires processing. It may be that there is a maximum desired length of path that is to be processed. For example, it may be desirable that the system only processes the path in smaller and more manageable sections, and so a path length threshold, length (path), is set and stored in memory. Step 261 carries out a check that the current waypoint $wp_n$ is smaller than the length(path) threshold. In addition, a check is carried out that the current waypoint $wp_n$ is smaller than the maximum waypoint in the sequence $wp_{max}$. If the answer to either of these checks is no, then processing of the waypoints is stopped and the method comes to an end in step 262.

However, if the waypoint $wp_n$ is to be processed, the method continues to step 263. The horizon point is typically set at a predetermined number of waypoints away ahead in the sequence. This predetermined number of waypoints is stored as parameter horizon_step. In step 263, a calculation is carried out to see if the current waypoint $wp_n$ plus the horizon_step is greater than the path length threshold length (path). If not, the horizon point is set at the waypoint determined by that calculation, $wp_n$+horizon_step. The method then continues on to the first step 270 of next stage which will be described with reference to FIG. 27.

However, if the current waypoint $wp_n$ plus the horizon_step is greater than the path length threshold length (path), then the horizon point is set at the last waypoint in the maximum path length set by the path length threshold, last_waypoint, as indicated by step 265. Steps 266 and 267, which can be skipped if not required by the system, carry out a check to see if the current way point $wp_n$ is the same as the last_waypoint, and then the method continues on to the next stage described in FIG. 27.

Figure 27:
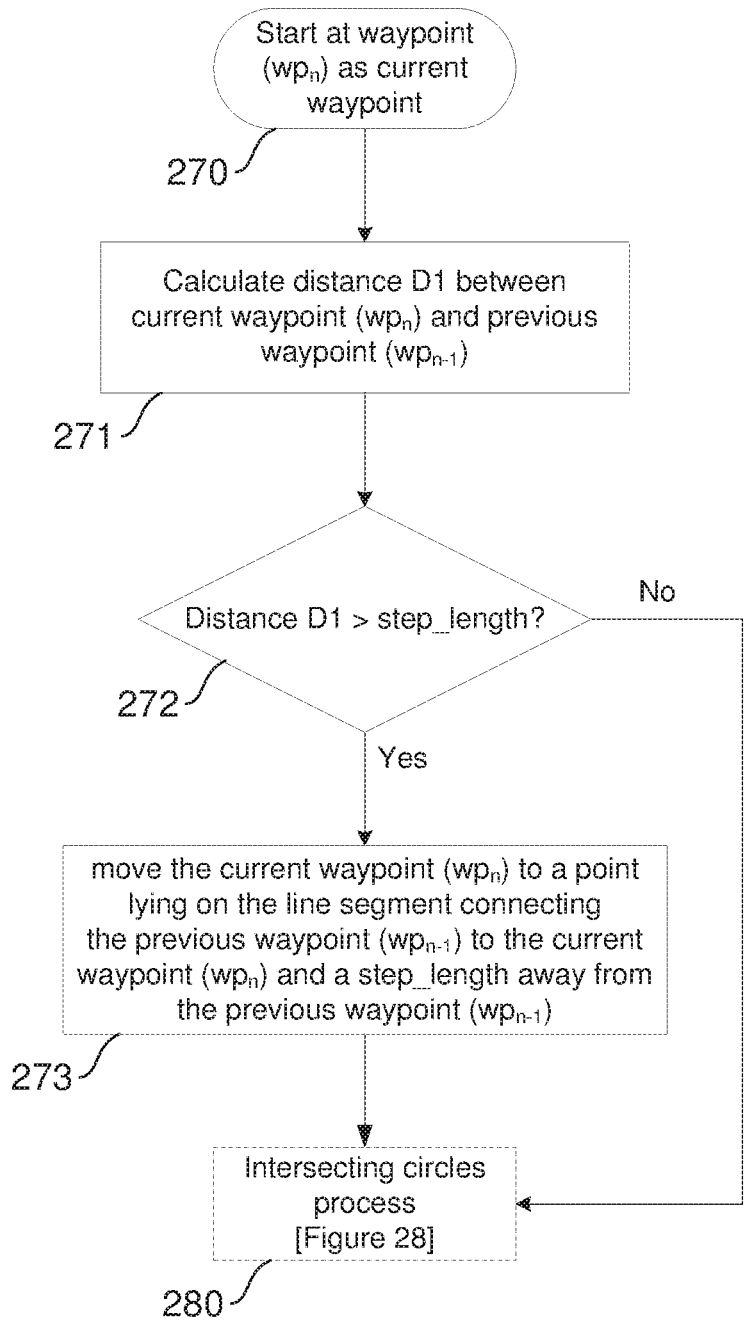

FIG. 27 sets out the steps of a step_length check. This method ensures that waypoints remain a predetermined step_length threshold away from the previous waypoint, which in turn reduces the risk that a vehicle that subsequently travels on the path will be required to travel large distances between waypoints, as these large distance may not have been analysed for being clear of obstacles. In step 271 a distance D1 is calculated between the current waypoint $wp_n$ and a previous waypoint $wp_{n-1}$. In the method exemplified in FIG. 27, the previous waypoint used is wpn−1, however it will be appreciated that a different previous waypoint could be used instead if desired. The distance D1 is then compared with the step_length threshold in step 272, and if D1 is less than the step_length threshold, then the method continues on to the first step 280 of the next stage which will be described with reference to FIG. 28.

However, if in step 272 distance D1 is greater than the step_length threshold, then the current waypoint $wp_n$ is moved in step 273. The current waypoint $wp_n$ is moved to a new point that lies on a line segment that connects the previous waypoint $wp_{n-1}$ to the current waypoint $wp_n$ and that is a distance equal to the step_length threshold away from the previous waypoint $wp_{n-1}$. Once the current waypoint has been moved, then the method continues on to the first step 280 of the next stage which will be described with reference to FIG. 28.

Figure 28:
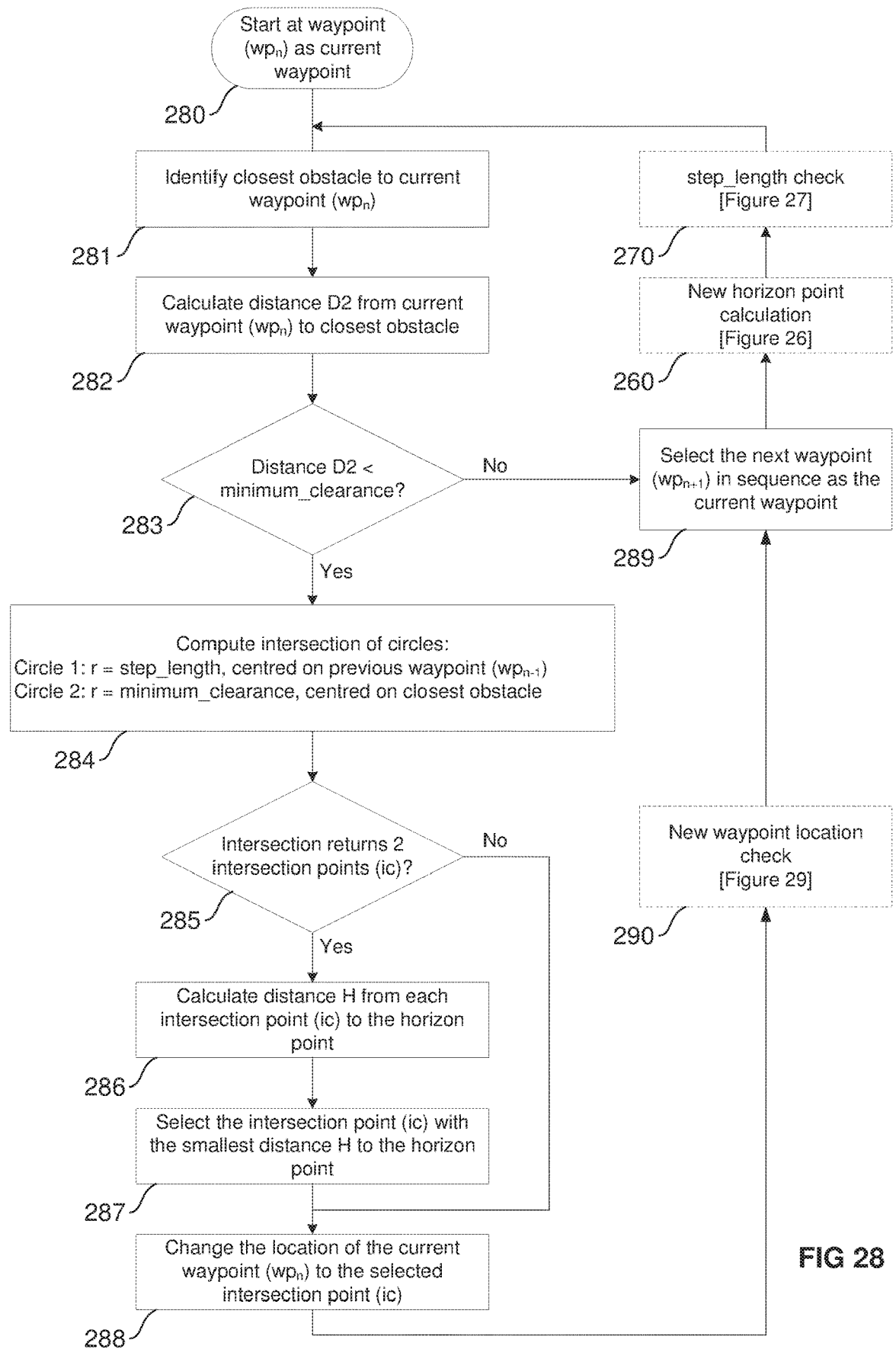

FIG. 28 sets out the steps of a method that ensures the path remains at least a set distance away from any obstacles within an environment. In step 281, the closest obstacle to the current waypoint $wp_n$ is identified. In step 282, a distance D2 is calculated from the current waypoint $wp_n$ to the closest obstacle identified in step 281. In step 283, distance D2 is compared with a predetermined threshold minimum_clearance. The minimum_clearance threshold can be set depending on the requirements of the robot. Usually, the minimum_clearance threshold will be set at the maximum radius of the robot that is intended to travel on the path being planned. As such it can be assured that the robot will remain at least its maximum radius away from any obstacles. Of course, other minimum_clearance thresholds could be adopted depending on the requirements of the robot or system, and also could vary depending on the type of environment through which path is being planned. If in step 283 distance D2 is greater than the minimum_clearance threshold, then the current waypoint is deemed far enough away from its nearest obstacle, and it does not need to be moved. The method then continues to step 289 which selects the next waypoint $wp_{n+1}$ in sequence as the current waypoint, and continues through the next iteration. The methods of FIGS. 26 and 27 may be carried out again on the next waypoint as indicated by the dashed boxes labelled 260 and 270 in FIG. 28.

However, if in step 283 distance D2 is less than the minimum_clearance threshold, then the method continues to step 284, in which an intersection of two circles is carried out. Although the method of FIG. 28 describes the intersection of two circles, it should be understood that this is only one particular embodiment. What is actually required is that a set of points are computed, where the set of points are those that are positioned at both a step_length from the previous waypoint $wp_{n-1}$ and also at a minimum_clearance distance from the identified closest obstacle. However, calculating the intersection of two circles provides a simple geometric analysis that is equivalent to computing the set of points as described above. The first circle, circle 1, is a circle with a radius equal to the step_length threshold and which is centred on previous waypoint $wp_{n-1}$, and the second circle, circle 2, is a circle with a radius equal to the minimum_clearance threshold, and which is centred on the closest obstacle. The computation of the set of points, or the geometric analysis of the intersection points, ic, of circle 1 and circle 2 should return the same points, and there may be one or two points returned. If more than one point is returned, then a preferred intersection point must be selected.

Step 285 determines if two intersection points, ic, are returned from step 284. If only one point is returned, then it is not necessary to make a selection for a preferred point and the method continues straight to step 288 at which the location of the current waypoint $wp_n$ is changed so it is moved to the intersection point returned from step 284.

However, if more than one intersection point ic is returned from step 284, then in step 286 a distance H is calculated for each intersection point ic, where distance H is the distance between the intersection point ic and the horizon point that was previously calculated in the method of FIG. 26. The preferred point of the two intersection points is then selected in step 287, by selecting the intersection point that has the smallest distance H to the horizon point. This one is chosen as by selecting the intersection point with the smallest distance H to the horizon point as the preferred point, this keeps the planned path as close as possible to the original unprocessed pathway. Once the preferred point has been selected, the method continues on to step 288 at which the location of the current waypoint $wp_n$ is changed so it is moved to the preferred point.

The method may then continue to step 289 which selects the next waypoint $wp_{n+1}$ in sequence as the current waypoint, and continues through the next iteration, and once again the methods of FIGS. 26 and 27 may be carried out on the next waypoint as indicated by the dashed boxes labelled 260 and 270 in FIG. 28. However, as indicated by the dashed box 290 in FIG. 28, before selecting a new waypoint, a further check method may be carried out to check the new location of the current waypoint $wp_n$ before moving on to the next waypoint in the sequence. The steps of the method for carrying out the new waypoint location check will now be described with reference to FIG. 29.

Step 290 continues straight from step 288 once the location of the current waypoint $wp_n$ has been changed, and the closest obstacle to the new position of the current waypoint $wp_n$ is identified. Then, in step 291, a distance D3 is calculated between the new location of the current waypoint $wp_n$ and the closest obstacle identified in step 290. In step 292 the distance D3 is then compared with the minimum_clearance threshold. If distance D3 is less than the minimum_clearance threshold, this means that the new location of the current waypoint $wp_n$ is too close to the obstacle, and therefore the current waypoint $wp_n$ is discarded in step 293, and it is deleted from the sequence. After discarding the waypoint in step 293, the method continues by selecting the next waypoint $wp_{n+1}$ in sequence as the current waypoint, which is returning to step 289 of FIG. 28, and the remainder of the method carries on as previously described.

However, if distance D3 is greater than the minimum_clearance threshold in step 292, then the method continues to step 294, where it is checked if the current waypoint $wp_n$ is at the target point at the end of the path. If it is, then the path planning operation is complete and the method ends at step 299. Alternatively, instead of checking if the current waypoint is at the target point, instead it may be checked if the current waypoint is at $wp_{max}$ or the waypoint at the end of length(path).

If the current waypoint is not the target point, then it is sensible to ensure that the new location of the current waypoint $wp_n$ is not directing the path in a wrong direction back on itself instead of towards the target point. In order to do this, in step 295 a distance D4 is calculated from the current waypoint $wp_n$ to the previous waypoint $wp_{n-1}$, then in step 296 a distance D5 is calculated from the current way point $wp_n$ to a waypoint that is previous to the previous way point, $wp_{n-2}$. Then in step 297 distance D4 is compared with distance D5, and if distance D5 is less than distance D4, then it can be deduced that the path is directing back towards itself instead of towards the target point, and therefore the current waypoint $wp_n$ is discarded in step 298, and it is deleted from the sequence. After discarding the waypoint in step 298, the method continues by selecting the next waypoint $wp_{n+1}$ in sequence as the current waypoint, which is returning to step 289 of FIG. 28, and the remainder of the method carries on as previously described.

However, if distance D5 is greater than distance D4 in the comparison of step 297, then the current waypoint $wp_n$ can be left in place in the sequence, and the method continues by selecting the next waypoint $wp_{n+1}$ in sequence as the current waypoint, which is returning to step 289 of FIG. 28, and the remainder of the method carries on as previously described for the next iteration.

Figure 6:
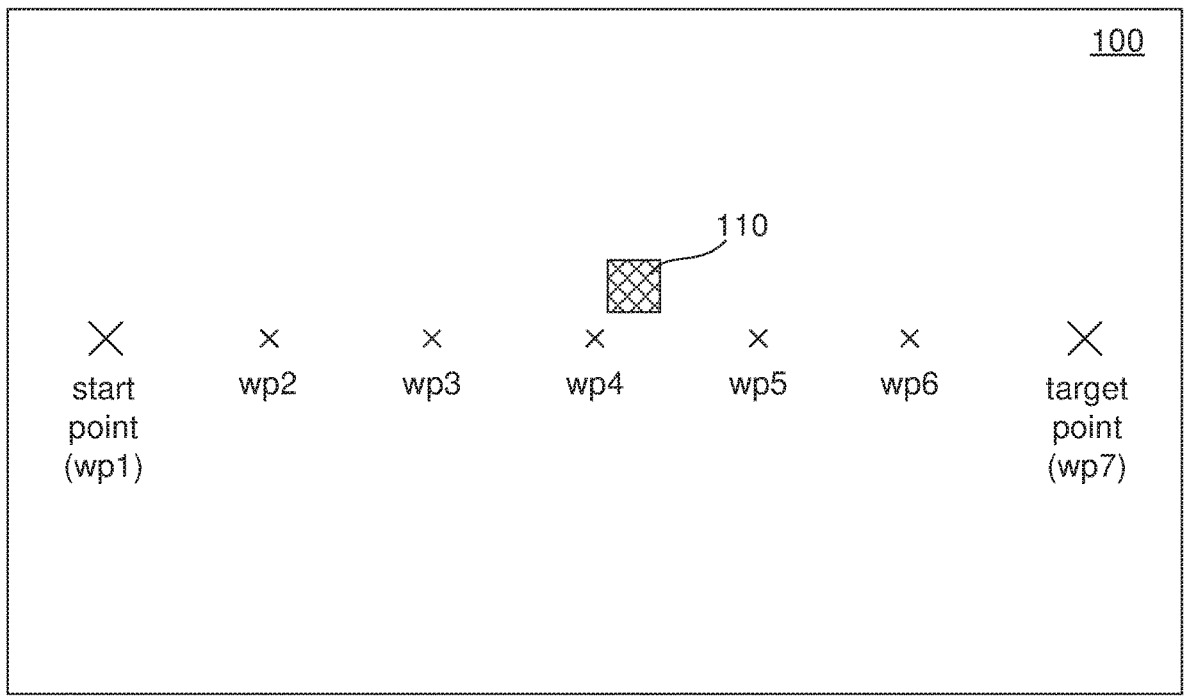
FIG. 6 shows a representation of an environment in which a robotic device is required to travel.

FIG. 6 shows a representation of an environment 100 in which a robotic device is to travel. A start point and a target point are indicated by large X symbols, and an obstacle 110 is located within the environment 100 that the robotic device will be required to manoeuvre around. A sequence of waypoints labelled wp1-wp7 are evenly and linearly distributed between the start point and the target point, whereby the first waypoint wp1 is located at the start point, the final waypoint wp7 is located at the target point, and intermediate waypoints wp2 to wp6 are positioned in a linear path between wp1 and wp7, and are represented by small x symbols.

During the processing of each of the waypoints, each of the methods of the flow diagrams of FIGS. 26 to 29 are carried out. However, for clarity some steps of the methods are not shown within in FIGS. 6 to 25.

Figure 7:
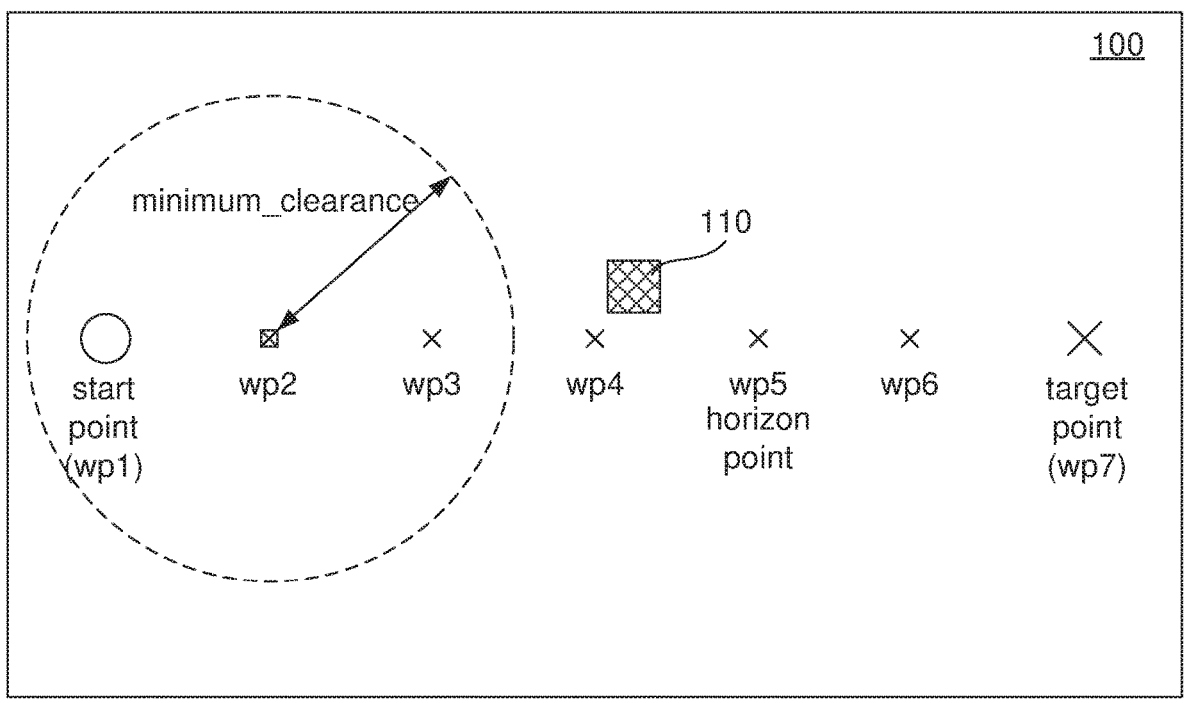
FIGS. 7 to 24 show various steps during a path planning operation carried out on the representation of the environment of FIG. 6.

The start point, or waypoint wp1, does not need to be processed as it is assumed that because the robotic device starts there, it is able to be there without overlapping with an obstacle. The first waypoint to be processed is therefore wp2. FIG. 7 shows the environment during the processing of the second waypoint wp2. The current way point being processed in each of the figures is represented by a x symbol surrounded by a box. In FIG. 7, waypoint wp5 is labelled as the horizon point. The horizon point is calculated in accordance with the method of FIG. 26 described above. In this example, the horizon_step has been set at three waypoints length, therefore the current horizon has been calculated as being wp2+3, which is wp5. Although not shown, the distance between wp1 and wp2 has been calculated in accordance with the method described above in relation to FIG. 27, and the calculated distance is within a predetermined step_length threshold. As a result, method has continued on to the method described in FIG. 28. FIG. 7 shows a dotted circle that is positioned around the current waypoint of interest wp2. The circle has a radius that is equal to the minimum_clearance threshold that has been set for this path planning operation. It can easily be seen that the obstacle 110 is located at a far enough distance away from waypoint wp2, that the distance between wp2 and the obstacle 110, which is equivalent to distance D2 in FIG. 28, is greater than the minimum_clearance threshold. Therefore the method is able to leave wp2 in its current position and select the next waypoint in the sequence, which is wp3.

Figure 8:
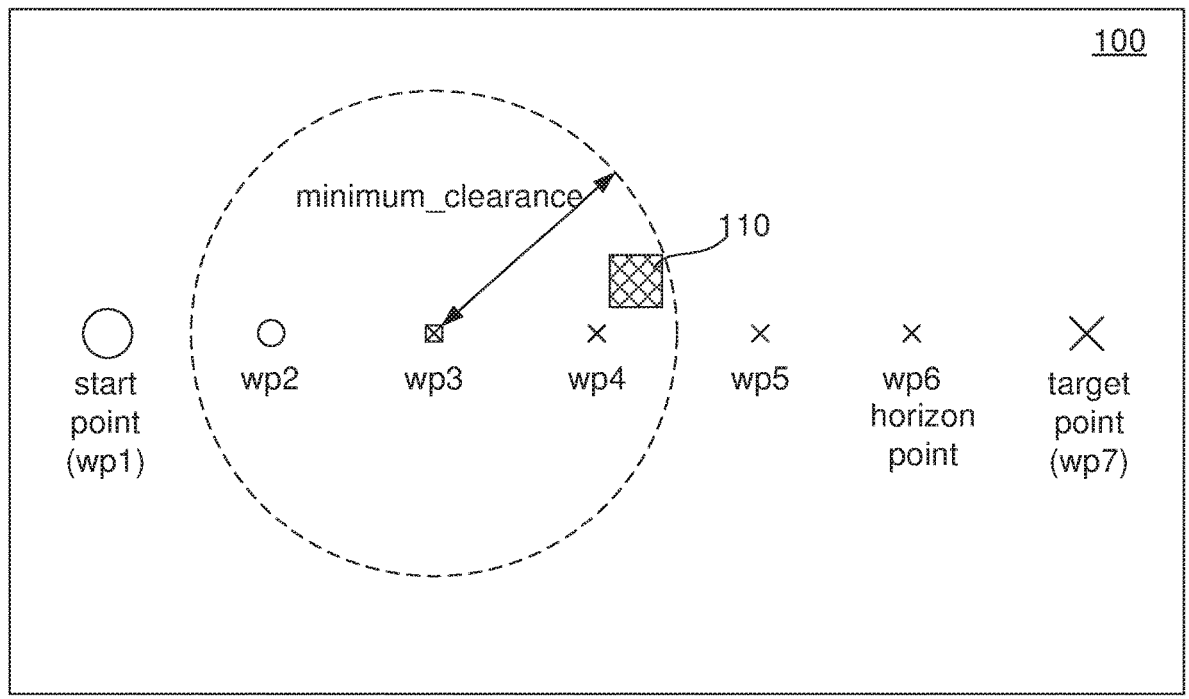
Figure 9:
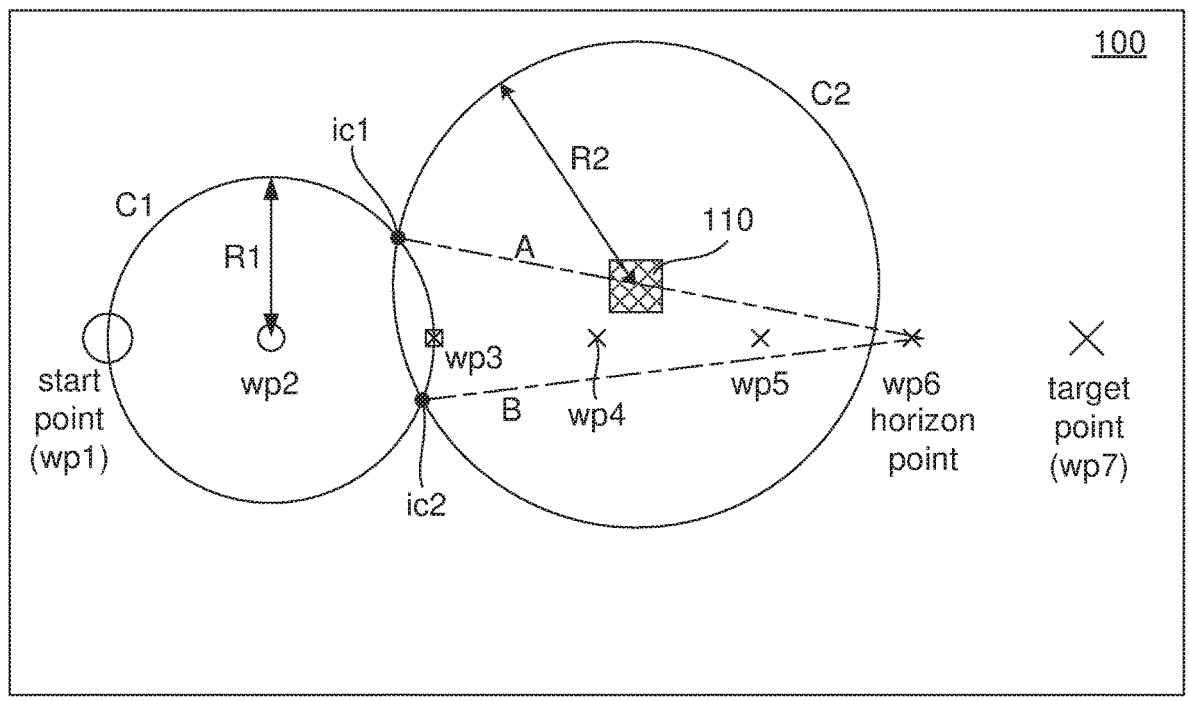
Figure 10:
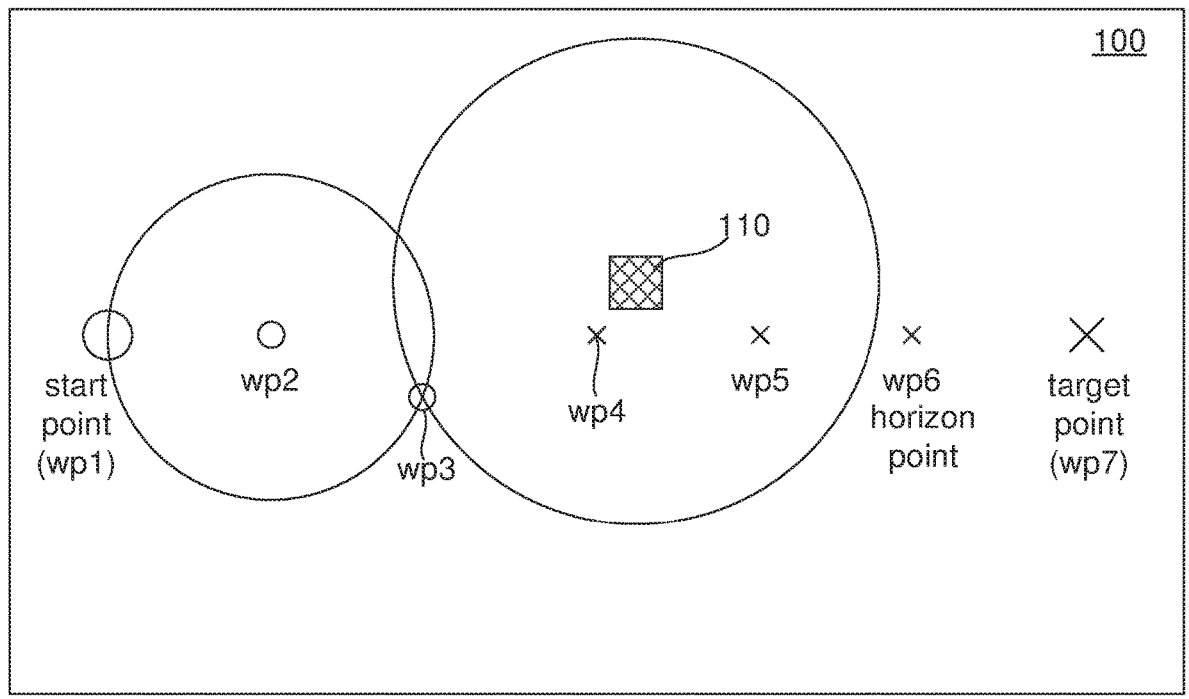
Figure 29:
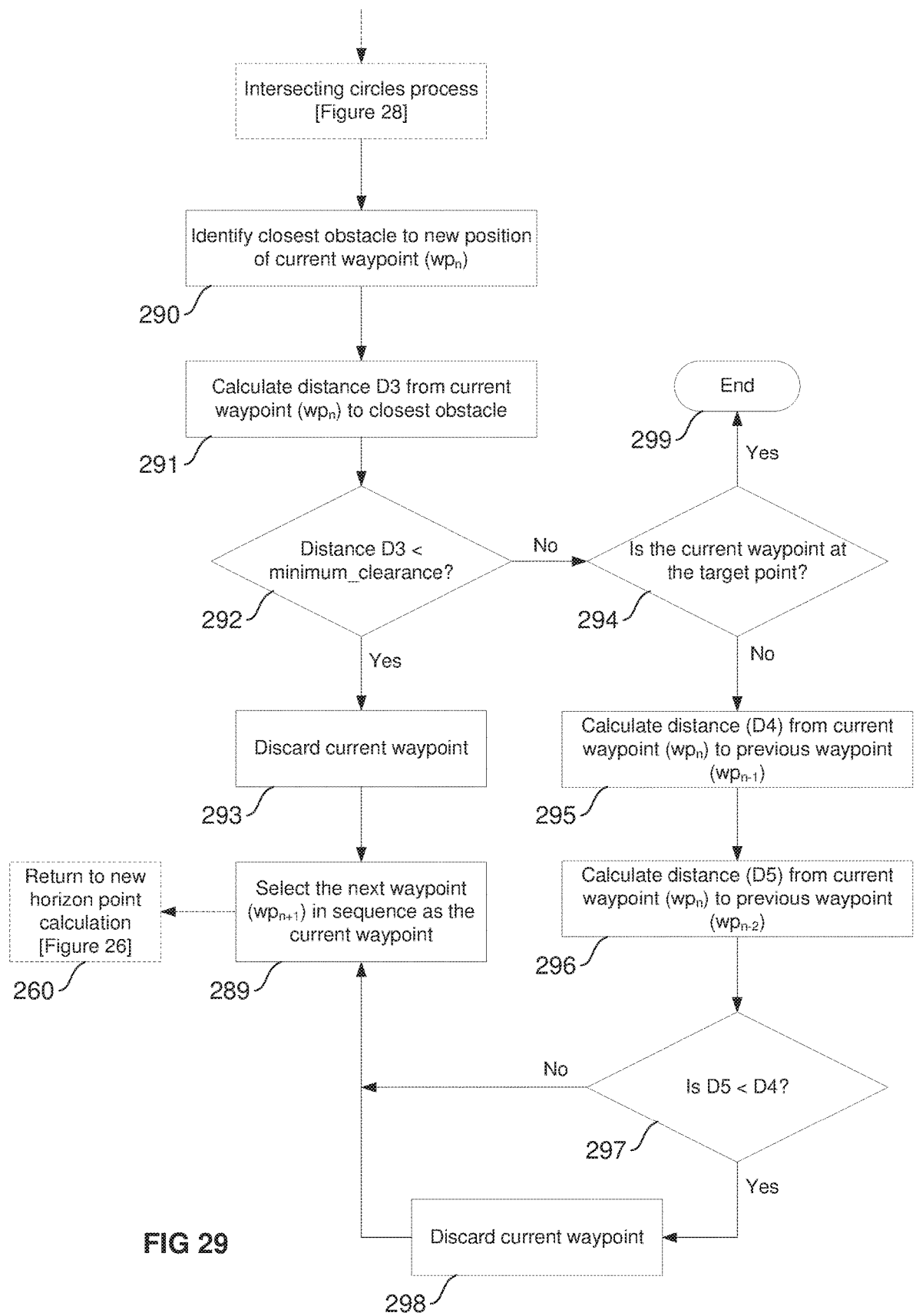

FIG. 8 shows a step in the processing of wp3. Here, wp3 is still within the step_length threshold of wp2. However, it is clear by the way the obstacle 110 falls inside the dotted circle that the distance between wp3 and the obstacle 110, which is equivalent to distance D2 in FIG. 28, is less than the minimum_clearance threshold. Therefore the location of waypoint wp3 must be changed. FIG. 9 shows two circles C1 and C2 which correspond to the two circles described in step 284 of FIG. 28. Circle C1 is centred on the previous waypoint, wp2, and has a radius R1 which is equal to the step_length threshold. Circle C2 is centred on the obstacle 110, and has a radius R2 which is equal to the minimum_clearance threshold. The two circles C1 and C2 create two intersection points ic1 and ic2. In order to determine which of the intersection points ic1 and ic2 is the preferred intersection point, distances A and B are calculated between each of the intersection points ic1, ic2 and the horizon point which has now been calculated as being wp6. As distance B is the shorter of the distances, intersection point ic2 is selected as the preferred point, and the location of wp3 is changed to be where ic2 is positioned, as shown in FIG. 10. Although not shown, the method of FIG. 29 is now carried out on the new position of wp3, which remains in position once the method has been carried out.

Figure 11:
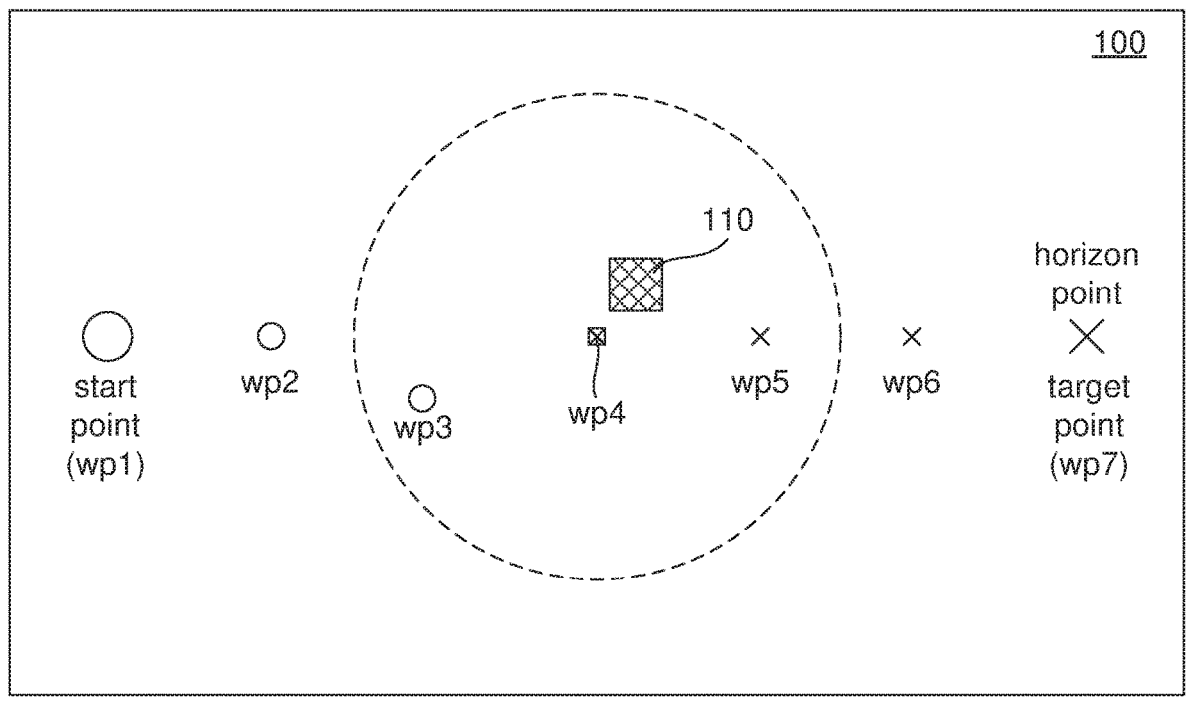
Figure 12:
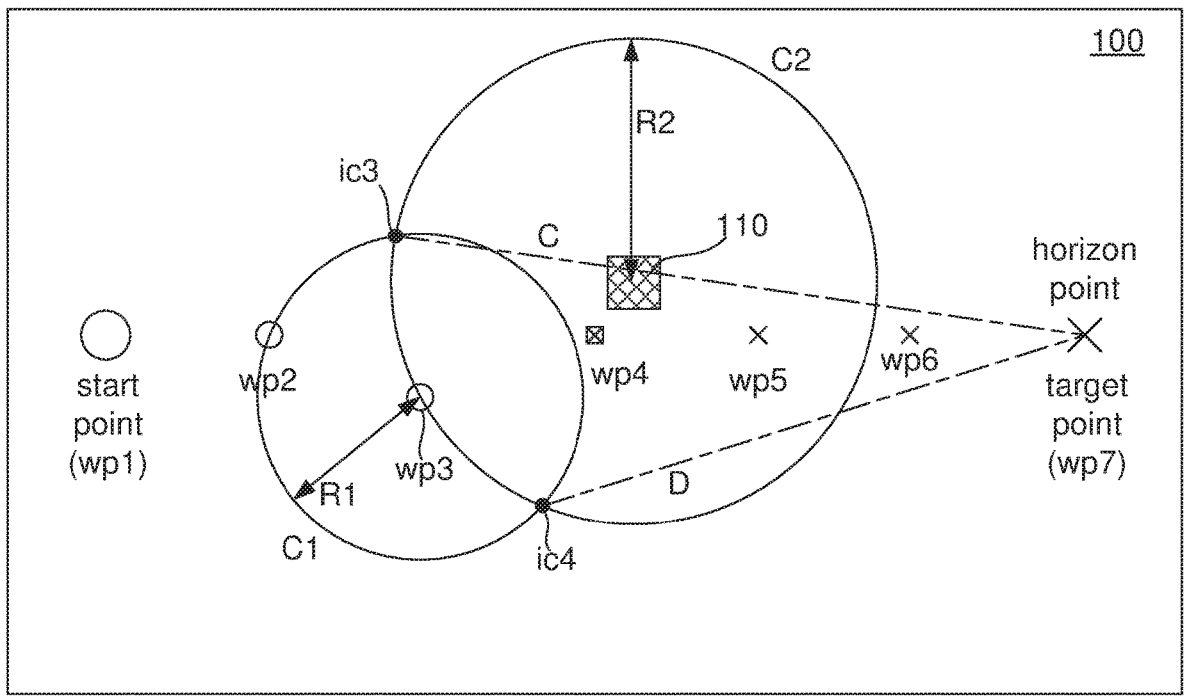
Figure 13:
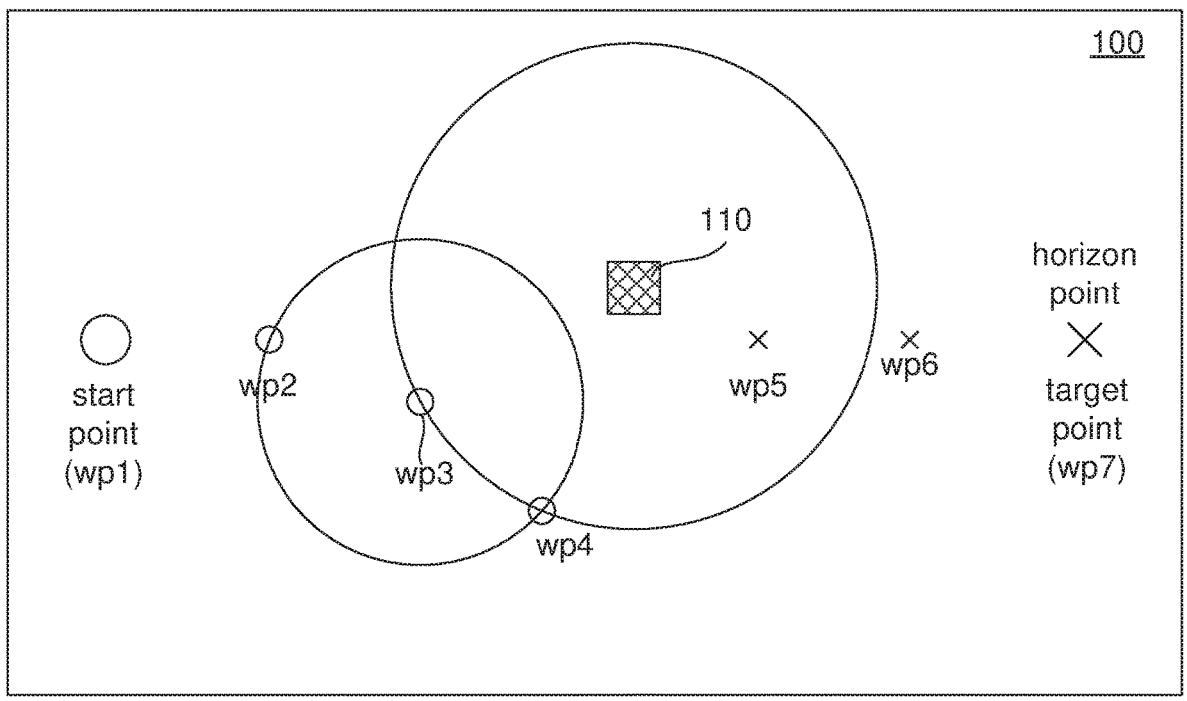
Figure 14:
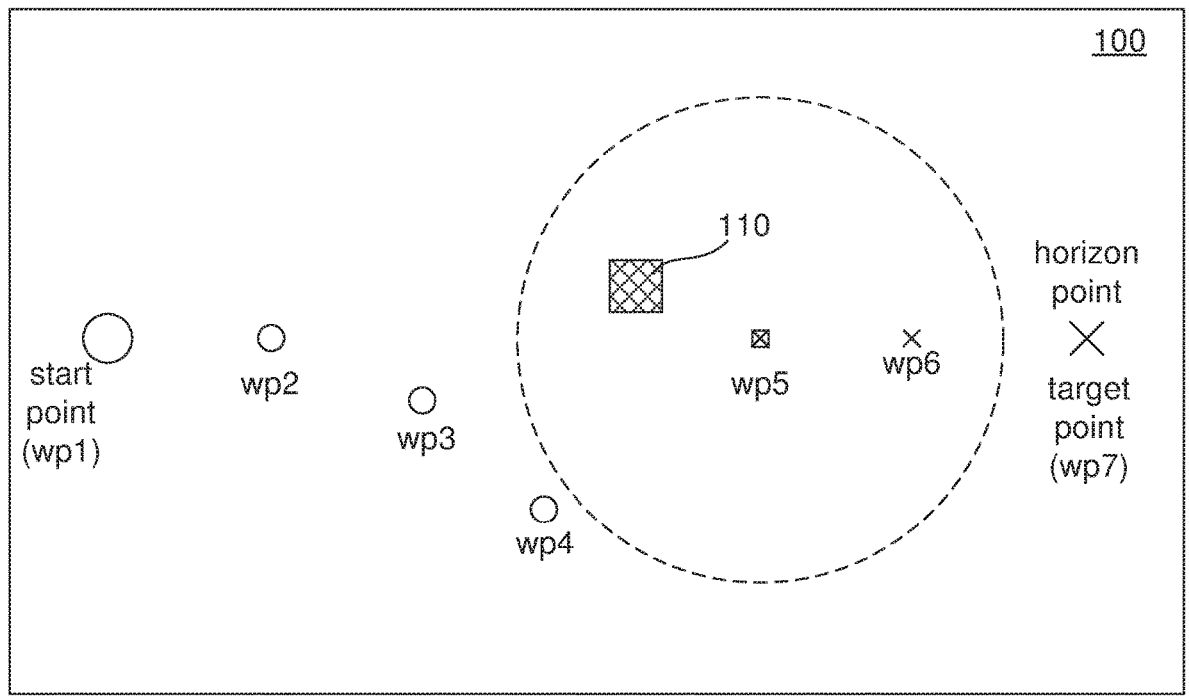
Figure 15:
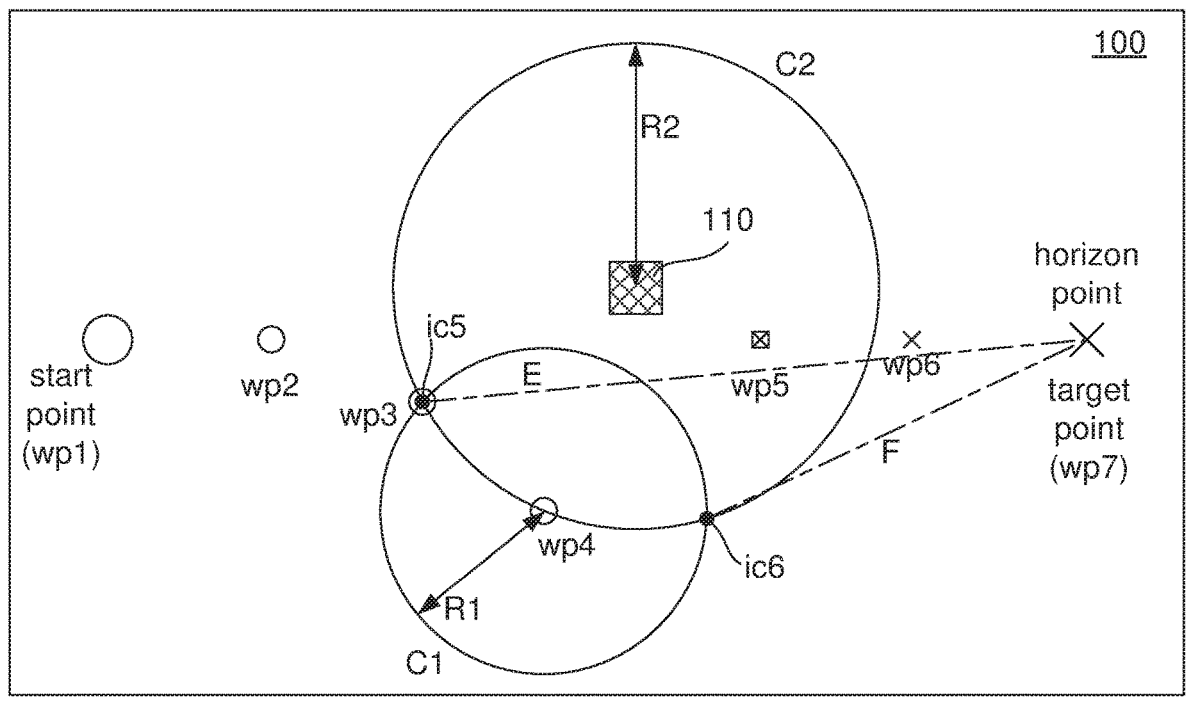
Figure 16:
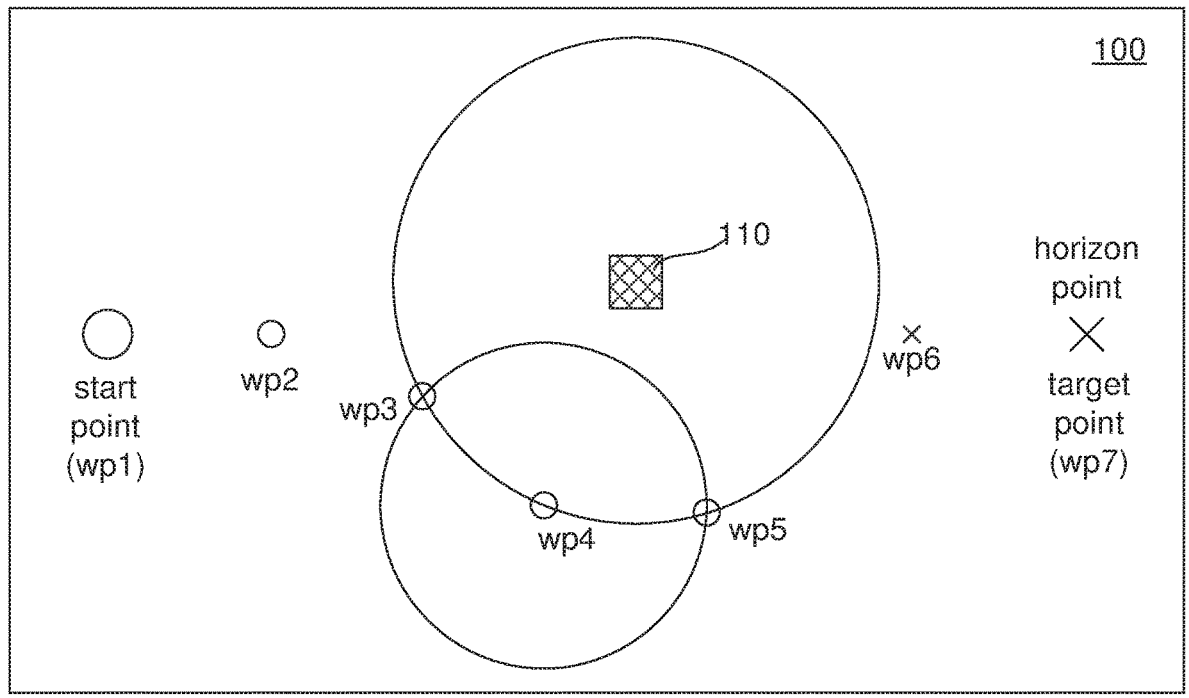

FIG. 11 shows a step in the processing of wp4. Again, it is clear by the way the obstacle 110 falls inside the dotted circle that the distance between wp4 and the obstacle 110, which is equivalent to distance D2 in FIG. 28, is less than the minimum_clearance threshold. Therefore the location of waypoint wp4 must be changed. FIG. 12 shows again the two circles C1 and C2 which correspond to the two circles described in step 284 of FIG. 28. As before while processing wp3, circle C1 is centred on the previous waypoint, which is now wp3, and has a radius R1 which is equal to the step_length threshold. Circle C2 is centred on the obstacle 110, and has a radius R2 which is equal to the minimum_clearance threshold. The two circles C1 and C2 create two new intersection points ic3 and ic4. In order to determine which of the intersection points ic3 and ic4 is the preferred intersection point, distances C and D are calculated between each of the intersection points ic3, ic4 and the horizon point which has now been calculated as being wp7 which is also the target point. As distance D is the shorter of the distances, intersection point ic4 is selected as the preferred point, and the location of wp4 is changed to be where ic4 is positioned, as shown in FIG. 13. FIG. 13 also shows that the new position of wp4 is at least the minimum_clearance away from the obstacle, and as the obstacle 110 is still the closest obstacle to the new location of wp4, the waypoint wp4 does not need to be discarded.

FIGS. 14, 15 and 16 again show the same process being repeated for the processing of wp5. This time the two circles C1 and C2 give rise to intersection points ic5 and ic6, and the location of ic6 is selected as being the preferred point to which the waypoint wp5 should be moved as distance F is smaller than distance E. The horizon point remains wp7 as this is the last waypoint in the sequence, and there are no further waypoints that the horizon point could be.

Figure 17:
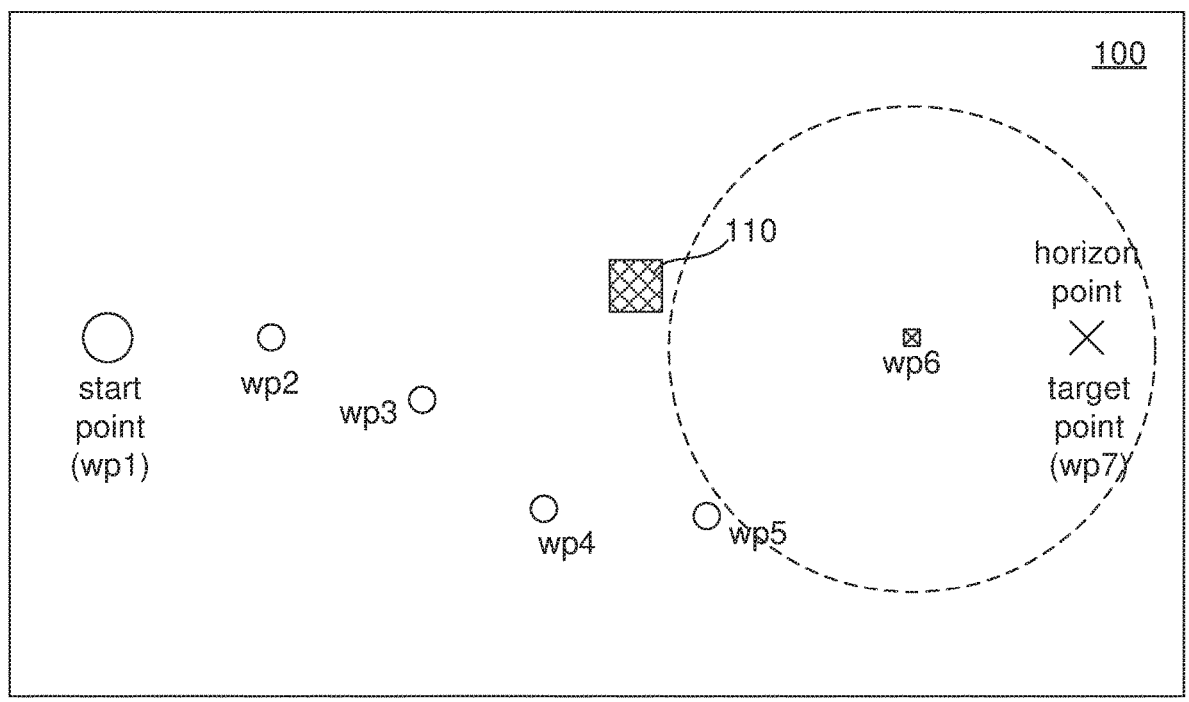
Figure 18:
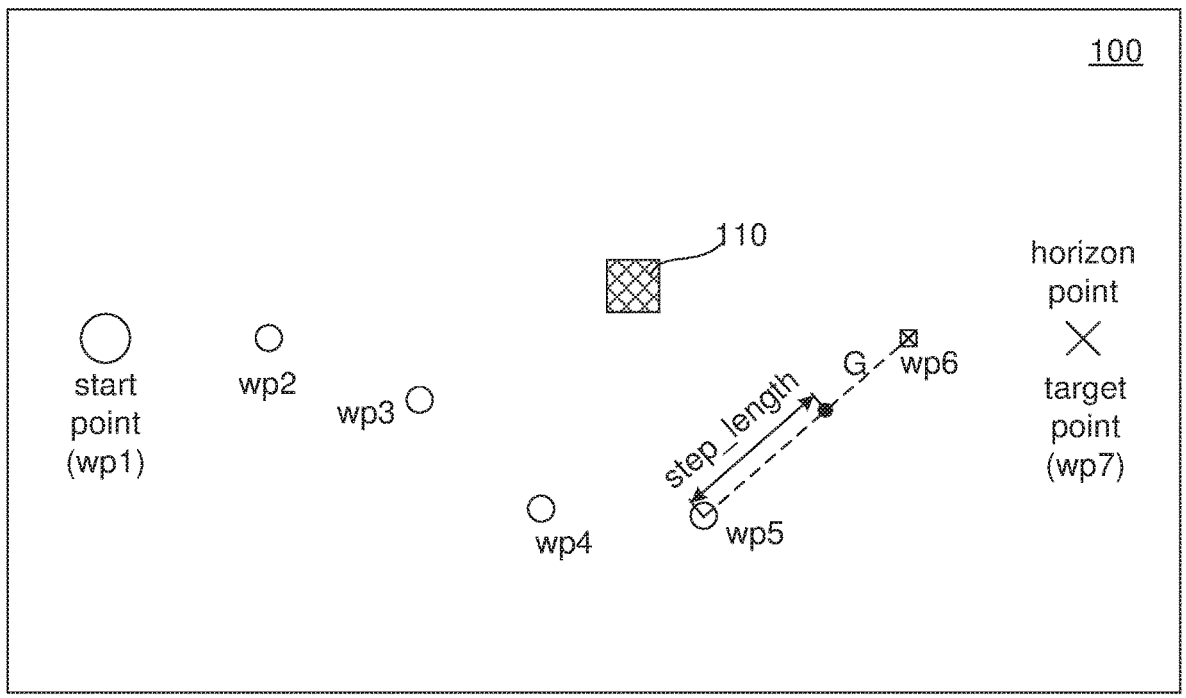

FIG. 17 shows the start of the processing of waypoint wp6. It is clear from FIG. 17 that the distance between the closest obstacle, which is still obstacle 110, and wp6 is greater than the minimum_clearance threshold as represented by the dotted circle. However, wp6 is a considerable distance from wp5. The method of FIG. 27 will now be demonstrated with reference to the processing of waypoint wp6 and FIG. 18. The distance between wp6 and wp5, which is represented by the dotted line labelled G is greater than the step_length threshold which is shown as a double headed arrow alongside the dotted line G. As a result, the current waypoint wp6 is therefore moved to a point along the dotted line G which connects wp5 and wp6. The point to which wp6 is moved is a distance away from wp5 that is equivalent to the step_length threshold.

Figure 19:
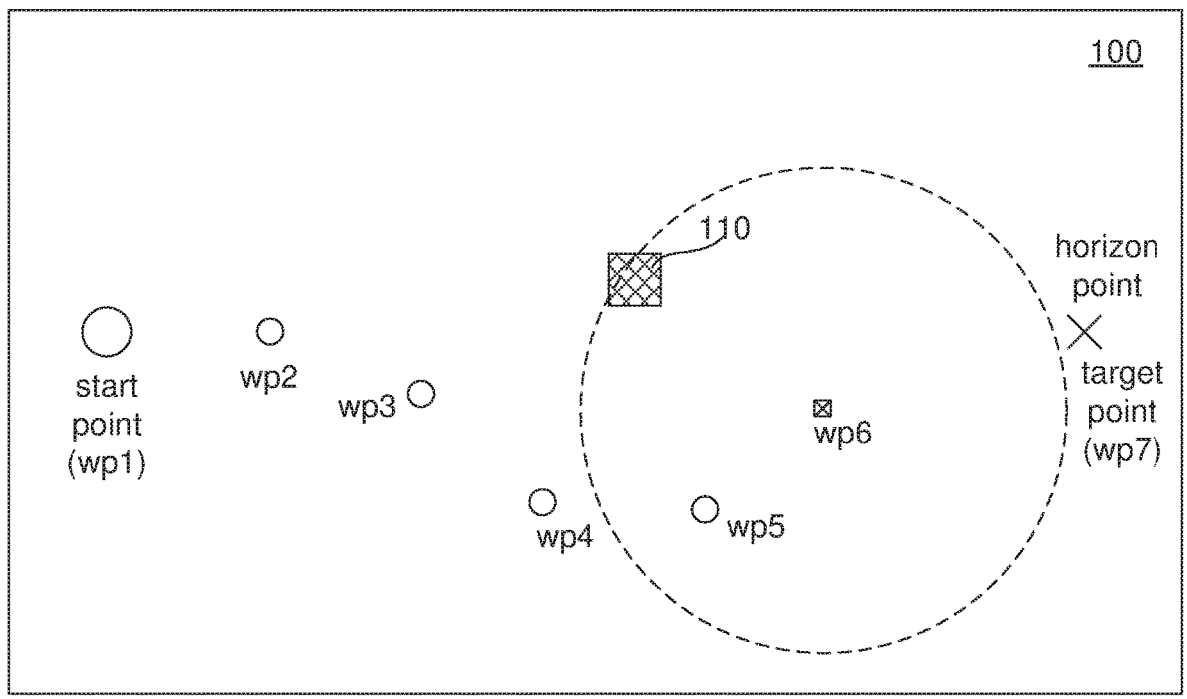
Figure 20:
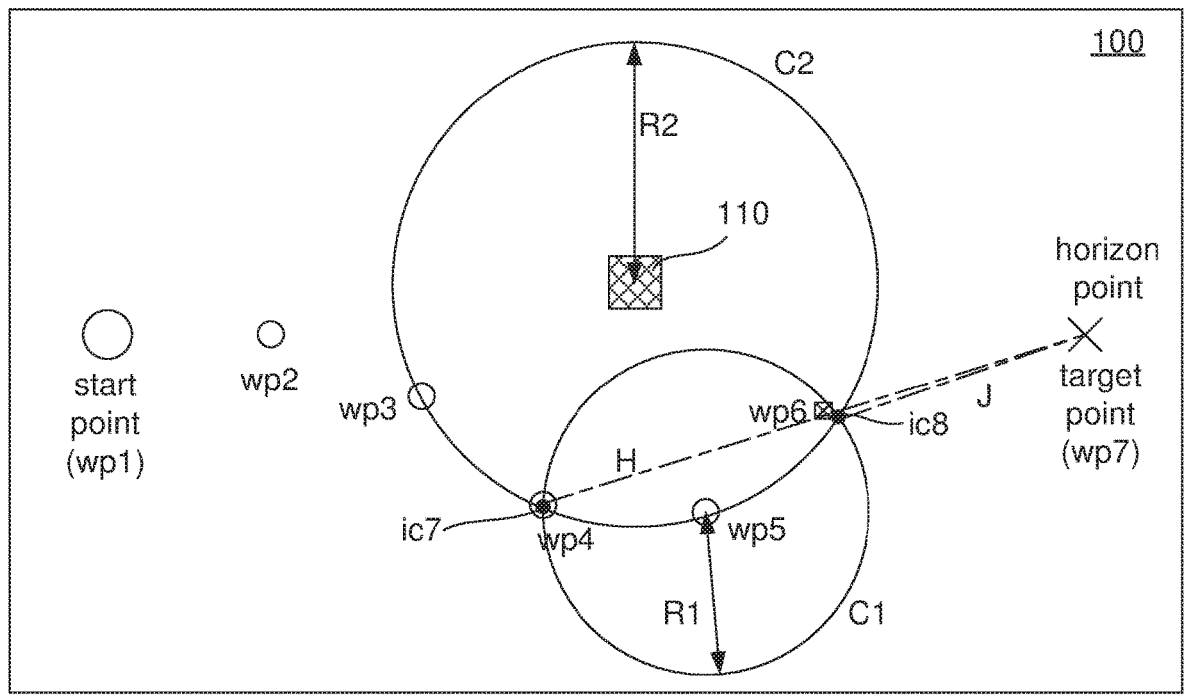
Figure 21:
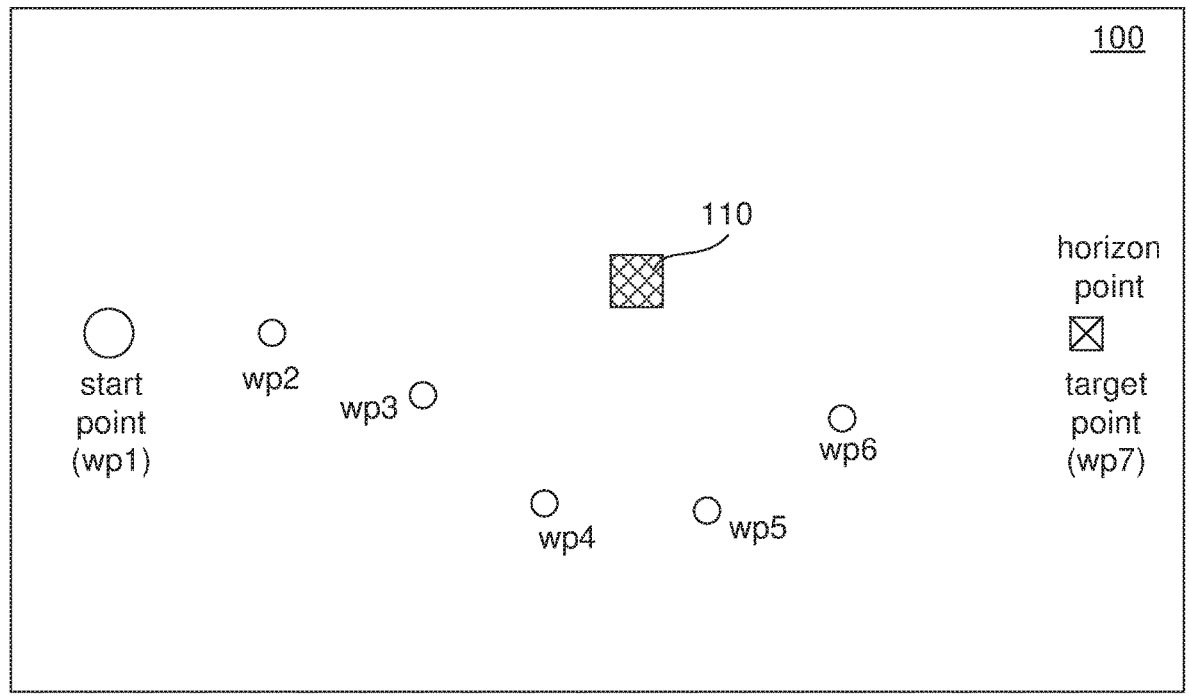

The new location of wp6 is shown in FIG. 19, but unfortunately the new location of wp6 has caused the distance from wp6 to its nearest obstacle to be less than the minimum_clearance threshold. Therefore the intersecting circles method of FIG. 28 must be carried out again on wp6 in its new location. This is shown in FIG. 20. This time the two circles C1 and C2 give rise to intersection points ic7 and ic8, and the location of ic8 is selected as being the preferred point to which the waypoint wp6 should be moved as distance J is smaller than distance H. The horizon point remains wp7 as this is the last waypoint in the sequence, and there are no further waypoints that the horizon point could be.

Figure 22:
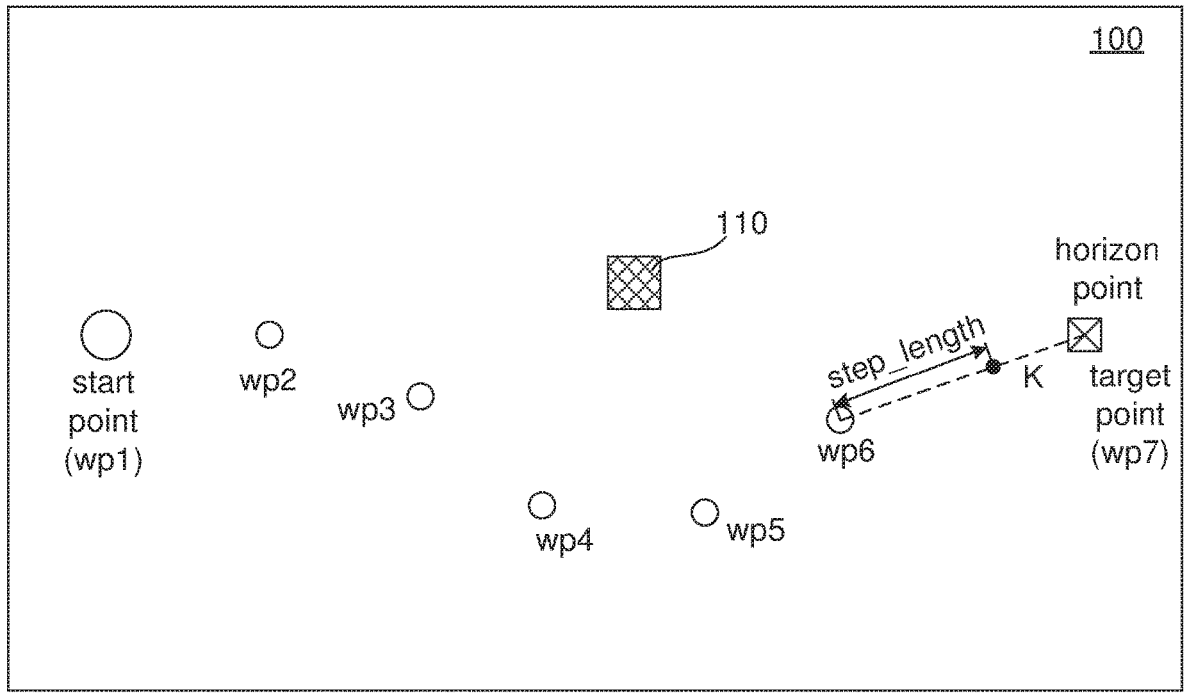
Figure 23:
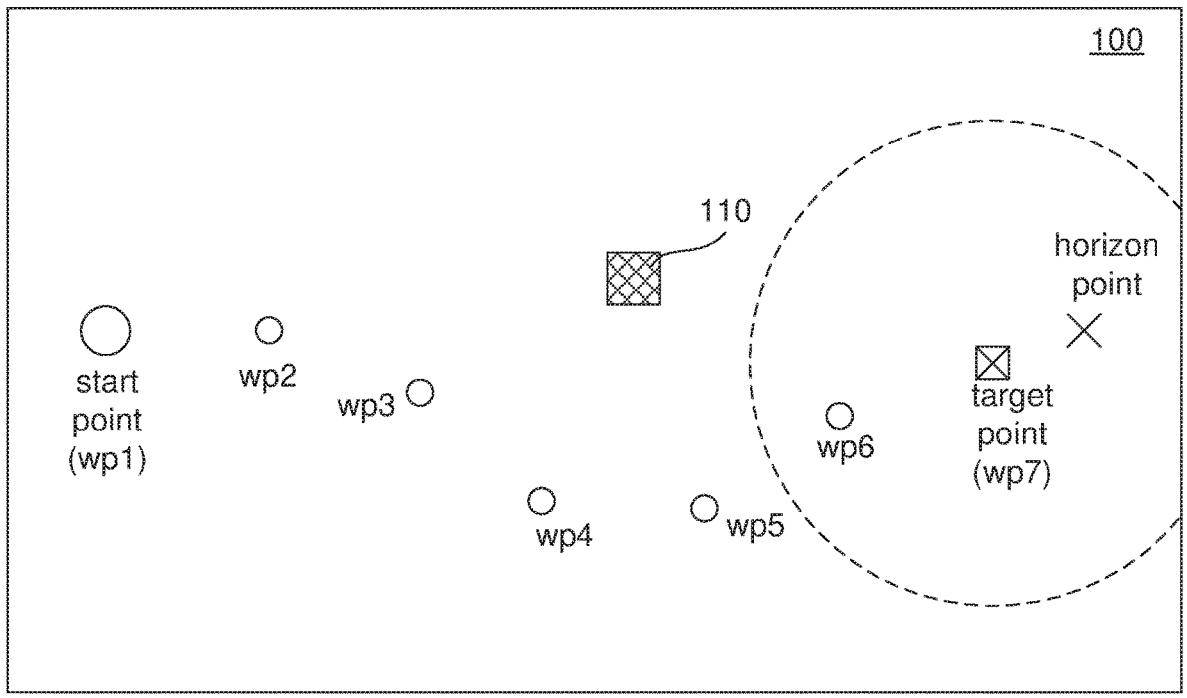

The last waypoint to be processed is wp7 which is also the target point. Again FIG. 22 shows that the distance between the current waypoint wp7 and previous waypoint wp6, as represented by the dotted line labelled K, is greater than the step_length threshold. As a result, the current waypoint wp7 is therefore moved to a point along the dotted line K which connects wp6 and wp7. The location to which wp7 is moved is a distance away from wp5 that is equivalent to the step_length threshold. The new position of wp7 is shown in FIG. 23. FIG. 23 also shows that the new position of wp7 is a distance away from the nearest obstacle 110 that is greater than the minimum_clearance threshold represented by the dotted circle, and therefore the waypoint does not need to be moved again. As wp7 is also the target point, and therefore the last waypoint to be processed in the sequence, the path planning operation ends. The final path showing the processed and updated waypoint positions can be seen in FIG. 24. FIG. 24 clearly shows how the path avoids the obstacle. Therefore when a vehicle takes the path that has been planned by this path planning operation the vehicle will be able to navigate the path without contacting the obstacle, or needing to readjust its trajectory during navigation.

FIG. 25 shows the end result of the path planning algorithm with the adjusted path represented by circle-shaped waypoints labelled wp1-7 shown alongside the original waypoints on a linear pathway represented by the cross-shaped waypoints, and labelled owp1-7.

The algorithm described above is intended to be run periodically during the motion of a robotic device. For example, the robotic device may have motion updates that run at a frequency of around 30-50 Hz, and the path planning algorithm may run during the motion updates, to plan a path for the robotic device to cover part of the upcoming intended path of the robotic device. Alternatively, the algorithm could be run once in the beginning of an operation, and may plot the entire path that is intended to be taken by the robotic device during that operation. In this alternative embodiment, the entire path could be split into a number of path segments, and the path planning algorithm may be run for each of the path segments until the entire path has been processed.

Whilst particular examples and embodiments have thus far been described, it will be understood that various modifications, some of which are already described above, may be made without departing from the scope of the invention as defined by the claims.

For example, in the examples given above, the previous waypoint has always been taken to be the waypoint immediately preceding the current waypoint, for instance if the current waypoint is $wp_n$, then the previous waypoint is $wp_{n-1}$. However, the previous waypoint could be any of the previous waypoints, for instance $wp_{n-2}$, $wp_{n-3}$ or $wp_{n-4}$ etc., depending on the requirements of the robot system, the path planning engine or the size of the path to be processed for example.

Furthermore, the various predetermined thresholds and parameters that are described herein such as the horizon_step, minimum_clearance, and step_length could differ to those suggested in the examples above. For instance, instead of the minimum_clearance being equal to the outer diameter of a robot, the minimum_clearance could be set using a user-selected confidence level that the user can adjust if they are concerned about a robot navigating too closely to delicate furniture or objects for example.

In addition, the method described above uses the intersection of circles to provide a simple geometric analysis, to return intersection points. However, other shapes could be used instead of circles such as polygons. What is more, if the path to be planned is a path through 3D space, as opposed to the 2D path exemplified herein, then the shape used could be a 3D shape such as a sphere.

The invention claimed is:

1. A method of determining an obstacle-free path between a start point and a target point, the method comprising:
   providing a plurality of waypoints wherein the plurality of waypoints are linearly distributed between the start point and the target point;
   determining a sequence for the plurality of waypoints where a first waypoint is positioned at the start point and a last waypoint is positioned at the target point; and
   processing each of the plurality of waypoints in the sequence iteratively from a second waypoint to the last waypoint,
   wherein the step of processing comprises identifying an obstacle closest to a waypoint of interest and calculating a first distance between the waypoint of interest and the identified closest obstacle, and subsequently changing a location of the waypoint of interest when the first distance is less than a clearance threshold.

2. The method of claim 1, wherein the step of changing the location of the waypoint of interest when the first distance is less than a clearance threshold comprises:
   computing a set of points that are positioned at both a first predetermined distance from a waypoint previous to the waypoint of interest and also at a second predetermined distance from the identified closest obstacle;
   selecting a preferred point from the set of points; and
   changing the location of the waypoint of interest to the preferred point.

3. The method of claim 2, wherein the step of computing the set of points comprises computing intersection points between a first shape and a second shape, wherein the first shape is centred at a waypoint previous to the waypoint of interest and with a radius equal to the first predetermined distance, and the second shape is centred at the identified closest obstacle and with a radius equal to the second predetermined distance, and wherein the intersection points are taken to be the set of points.

4. The method of claim 3, wherein the first and second shapes are one of a circle or a sphere.

5. The method of claim 2, wherein the first predetermined distance is equal to a step length between waypoints.

6. The method of claim 2, wherein the second predetermined distance is equal to the clearance threshold.

7. The method of claim 2, wherein the step of selecting a preferred point from the set of points comprises calculating distances between each computed point in the set of points and a horizon point, and selecting the point closest to the horizon point.

8. The method of claim 7, wherein the horizon point lies on a line connecting two consecutive waypoints in the sequence of waypoints between the waypoint of interest and the target point.

9. The method of claim 1, wherein the step of processing each of the plurality of waypoints in the sequence iteratively further comprises:
   calculating a third distance between the waypoint of interest and a previous waypoint in the sequence;
   comparing the third distance between the waypoint of interest and the previous waypoint with a predetermined step length threshold; and
   in accordance with the third distance between the waypoint of interest and the previous waypoint being greater than the predetermined step length threshold, changing the location of the waypoint of interest to a point lying on a line segment connecting the previous waypoint and a next waypoint in the sequence, the point being located on the line segment at a distance equal to the predetermined step length threshold from the previous waypoint.

10. The method of claim 9, wherein the previous waypoint is any of the waypoints in the sequence from the start point up to the waypoint of interest, and the next waypoint is any of the waypoints in the sequence from the waypoint of interest up to the target point.

11. The method of claim 2, wherein the method further comprises, after changing the location of the waypoint to the preferred point, identifying an obstacle closest to the new location of the waypoint of interest and calculating a fourth distance between the waypoint of interest and the identified closest obstacle, and subsequently removing the waypoint of interest from the sequence when the fourth distance is less than the clearance threshold.

12. The method of claim 2, wherein the method further comprises, after changing the location of the waypoint of interest to the preferred point, the additional steps:
   calculating a fifth distance between the waypoint of interest and a previous waypoint in the sequence;
   calculating a sixth distance between the waypoint of interest and a waypoint before the previous waypoint in the sequence;
   comparing the fifth distance with the sixth distance and, when the sixth distance is smaller than the fifth distance, removing the waypoint of interest from the sequence.

13. A system comprising:
   at least one memory storing:
      data relating to an environment including locations of any obstacles located in the environment;
      data relating to path planning comprising locations of a start point and a target point, a plurality of waypoints, a sequence of the plurality of waypoints, and a clearance threshold;
   a path planning engine comprising at least one processor, and configured to iteratively process each of the plurality of waypoints to determine an obstacle-free path between a start point and a target point,
   wherein, to process each of the plurality of waypoints the path planning engine is configured to identify an obstacle closest to a waypoint of interest, calculate a first distance between the waypoint of interest and the identified closest obstacle, and subsequently update data corresponding to a location of the waypoint of interest to change the location of the waypoint of interest when the first distance is less than the clearance threshold.

14. The system of claim 13, wherein to change the location of the waypoint of interest the path planning engine is configured to:
compute a set of points that are positioned at both a first predetermined distance stored in the at least one memory from a waypoint previous to the waypoint of interest and also at a second predetermined distance stored in the at least one memory from the identified closest obstacle;
select a preferred point from the set of points; and
update the data corresponding to the location of the waypoint of interest to change the location to the preferred point.

15. The system of claim 14, wherein in order to compute the set of points, the path planning engine is configured to compute intersection points between a first shape and a second shape, wherein the first shape is centred at a waypoint previous to the waypoint of interest and with a radius equal to the first predetermined distance and the second shape is centred at the identified closest obstacle and with a radius equal to the second predetermined distance, and wherein the intersection points are taken to be the set of points.

16. The system of claim 15, wherein the first and second shapes are one of a circle or a sphere.

17. The system of claim 14, wherein the first predetermined distance is equal to a step length between waypoints, the step length being stored in the at least one memory in the data relating to path planning.

18. The system of claim 14, wherein the second predetermined distance is equal to the clearance threshold.

19. The system of claim 14, wherein to select a preferred point from the set of points the path planning engine is configured to calculate distances between each computed point in the set and a horizon point, and then select the point closest to the horizon point.

20. The system of claim 19, wherein the horizon point lies on a line connecting two consecutive waypoints in the sequence of waypoints between the waypoint of interest and the target point.

21. The system of claim 13, wherein to iteratively process each of the plurality of waypoints the path planning engine is configured to:
calculate a third distance between the waypoint of interest and a previous waypoint in the sequence;
compare the third distance between the waypoint of interest and the previous waypoint with a predetermined step length threshold; and
in accordance with the third distance between the waypoint of interest and the previous waypoint being greater than the predetermined step length threshold, update the data corresponding to the location of the waypoint of interest to change the location of the waypoint of interest to a point lying on a line segment connecting the previous waypoint and a next waypoint in the sequence, the point being located on the line segment at a distance equal to the predetermined step length from the previous waypoint.

22. The system of claim 21, wherein the previous waypoint is any of the waypoints in the sequence from the start point up to the waypoint of interest, and the next waypoint is any of the waypoints in the sequence from the waypoint of interest up to the target point.

23. The system of claim 13, wherein after updating the data corresponding to the location of the waypoint of interest, the path planning engine is further configured to:
identify an obstacle closest to a new location of the waypoint of interest and calculate a fourth distance between the waypoint of interest and the identified closest obstacle; and
update the data relating to path planning to remove the waypoint of interest from the sequence when the fourth distance is less than the clearance threshold.

24. The system of claim 13, wherein after updating the data corresponding to the location of the waypoint of interest, the path planning engine is further configured to:
calculate a fifth distance between the waypoint of interest and a previous waypoint in the sequence;
calculate a sixth distance between the waypoint of interest and a waypoint before the previous waypoint in the sequence;
compare the fifth distance with the sixth distance; and
in accordance with the sixth distance being smaller than the fifth distance, update the data relating to path planning to remove the waypoint of interest from the sequence.

25. A robotic device comprising:
the system of claim 13;
one or more actuators to enable the robotic device to navigate within a surrounding three-dimensional environment; and
a navigation engine comprising at least one processor to control the one or more actuators, wherein the navigation engine is configured to use the data relating to the environment and the data relating to path planning to navigate the robotic device along an obstacle-free path within the surrounding three-dimensional environment.

26. A non-transitory computer-readable storage medium comprising computer-executable instructions which, when executed by a processor of a computing device, cause the computing device to:
provide a plurality of waypoints wherein the plurality of waypoints are linearly distributed between a start point and a target point;
determine a sequence for the plurality of waypoints where a first waypoint is positioned at the start point and a last waypoint is positioned at the target point; and
processing each of the plurality of waypoints in the sequence iteratively from a second waypoint to the last waypoint,
wherein the step of processing comprises identifying an obstacle closest to a waypoint of interest and calculating a first distance between the waypoint of interest and the identified closest obstacle, and subsequently changing a location of the waypoint of interest when the first distance is less than a clearance threshold.

* * * * *